(12) United States Patent
Renkema

(10) Patent No.: US 7,182,550 B2
(45) Date of Patent: Feb. 27, 2007

(54) ABANDONMENT AND RECOVERY HEAD APPARATUS

(75) Inventor: Douwe Renkema, Delfgauw (NL)

(73) Assignee: Heerema Marine Contractors Nederland B.V. (NL)

(*) Notice: Subject to any disclaimer, the term of this patent is extended or adjusted under 35 U.S.C. 154(b) by 0 days.

(21) Appl. No.: 10/853,856

(22) Filed: May 26, 2004

(65) Prior Publication Data

US 2005/0265788 A1    Dec. 1, 2005

(51) Int. Cl.
*F16L 1/12* (2006.01)
(52) U.S. Cl. ...................................... 405/173; 405/158
(58) Field of Classification Search ............. 405/154.1, 405/158, 166–168, 168.3, 173, 184.4; 166/340–343
See application file for complete search history.

(56) References Cited

U.S. PATENT DOCUMENTS

| | | | | |
|---|---|---|---|---|
| 3,620,028 A | * | 11/1971 | Wilde | 405/166 |
| 3,751,932 A | * | 8/1973 | Matthews, Jr. | 405/173 |
| 3,842,612 A | * | 10/1974 | Arnold | 405/173 |
| 4,257,719 A | * | 3/1981 | Hunt et al. | 405/173 |
| 4,493,590 A | * | 1/1985 | Ayers et al. | 405/170 |
| 4,687,378 A | * | 8/1987 | Jegousse et al. | 405/171 |
| 4,719,687 A | * | 1/1988 | Nanny | 405/158 |
| 5,188,483 A | * | 2/1993 | Kopp et al. | 405/191 |
| 5,421,674 A | * | 6/1995 | Maloberti et al. | 405/166 |
| 5,934,832 A | * | 8/1999 | Baugh | 405/173 |
| 6,402,428 B1 | * | 6/2002 | Morisi et al. | 405/158 |
| 6,729,802 B2 | * | 5/2004 | Giovannini et al. | 405/158 |
| 2003/0099515 A1 | * | 5/2003 | Giovannini et al. | 405/158 |

FOREIGN PATENT DOCUMENTS

| GB | 2214259 | * | 8/1989 |
|---|---|---|---|
| WO | WO200148410 | * | 7/2001 |

OTHER PUBLICATIONS

Alain Cotarel, in "MJ Lay, A Modular Deepwater Pipelay System" at Offshore Technology Conference, May 4-7, 1998, pp. 389-394.
Heerema Marine Contractors Nederland B.V. "For Construction," BP Mardi Gras, General Latch Mechanism for 576 m.T. Long Bow A & R Shackle—Sections, drawing illustration consisting of two pages was forwarded on Oct. 2, 2003 to a steel manufacturing shop by Heerema Marine Contractors Nederland B.V. where the construction was made in The Netherlands.
Heerema Marine Contractors Nederland B.V. "Fast A&R head," Daily Progress Report Balder Nov. 19, 2003 forwarded to Deepwater Construction Vessel (DCV) Balder by Heerema Marine Contractors Nederland B.V., publication date Nov. 19, 2003, in The Netherlands.

* cited by examiner

*Primary Examiner*—Frederick L. Lagman
(74) *Attorney, Agent, or Firm*—Haynes and Boone LLP; Todd Mattingly

(57) ABSTRACT

An abandonment and recovery head apparatus comprises a head member. A lift member is moveably coupled to the head member. A retaining device is operable to hold the lift member in an accessible position.

50 Claims, 16 Drawing Sheets

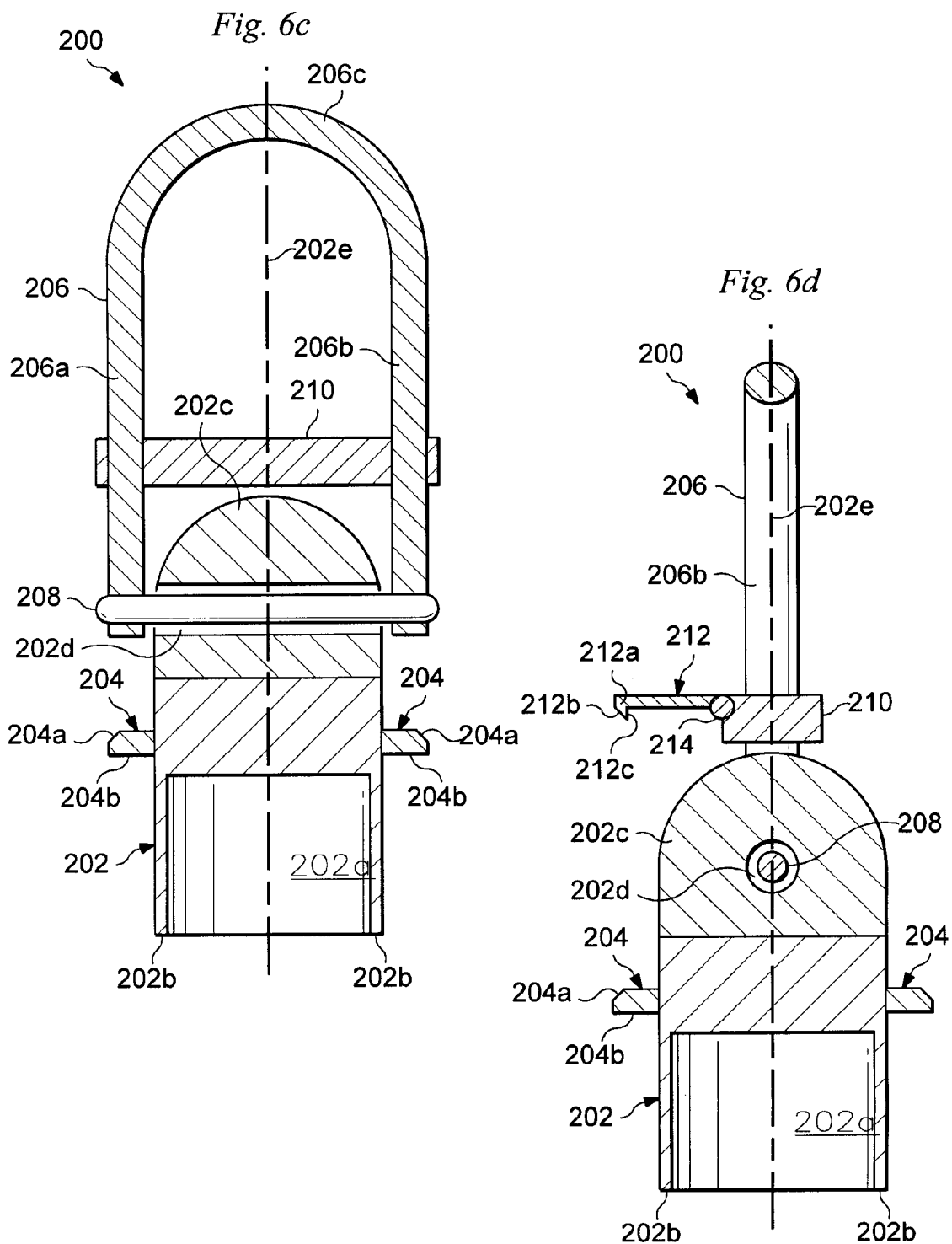

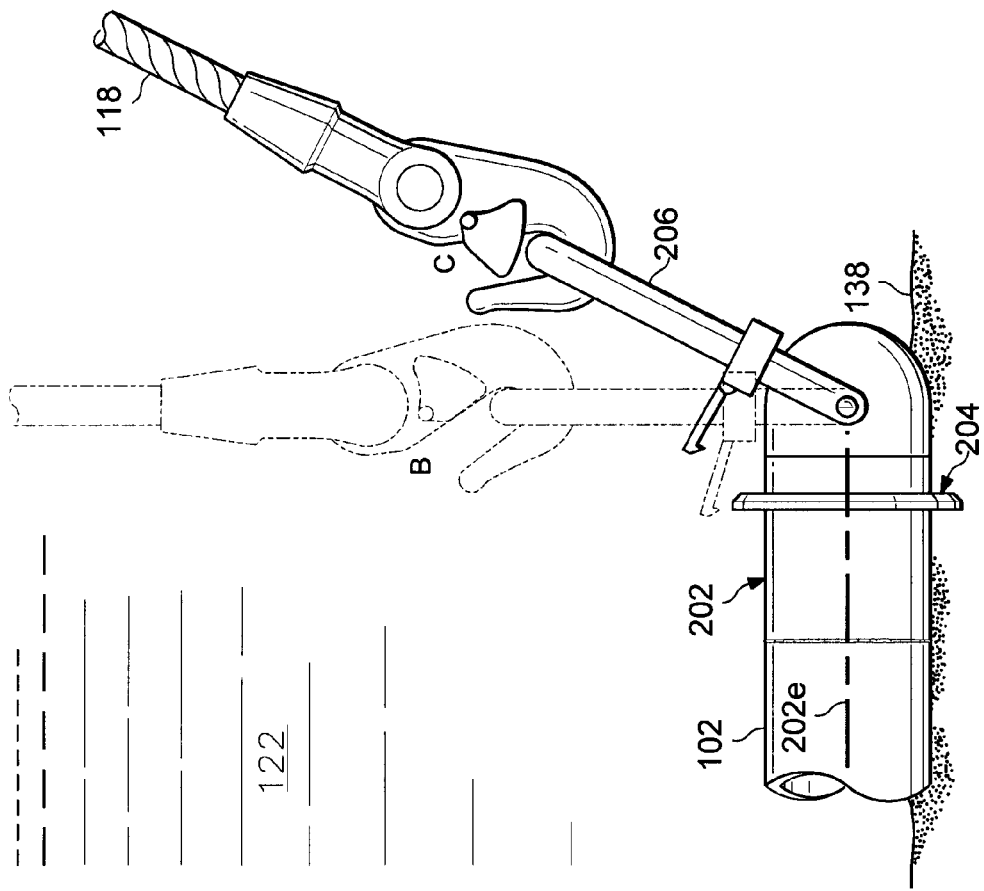
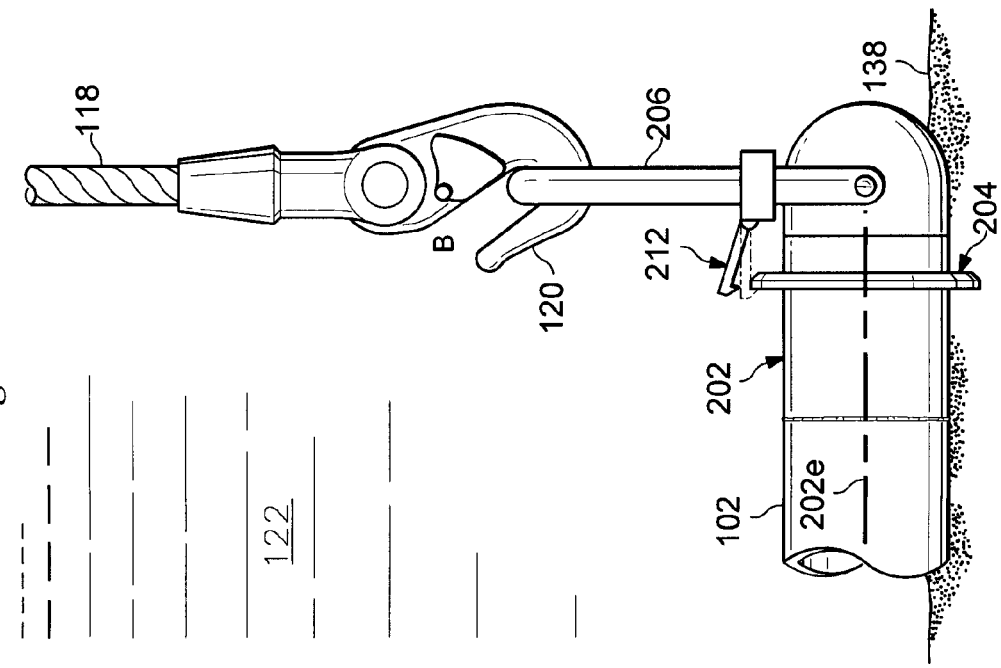

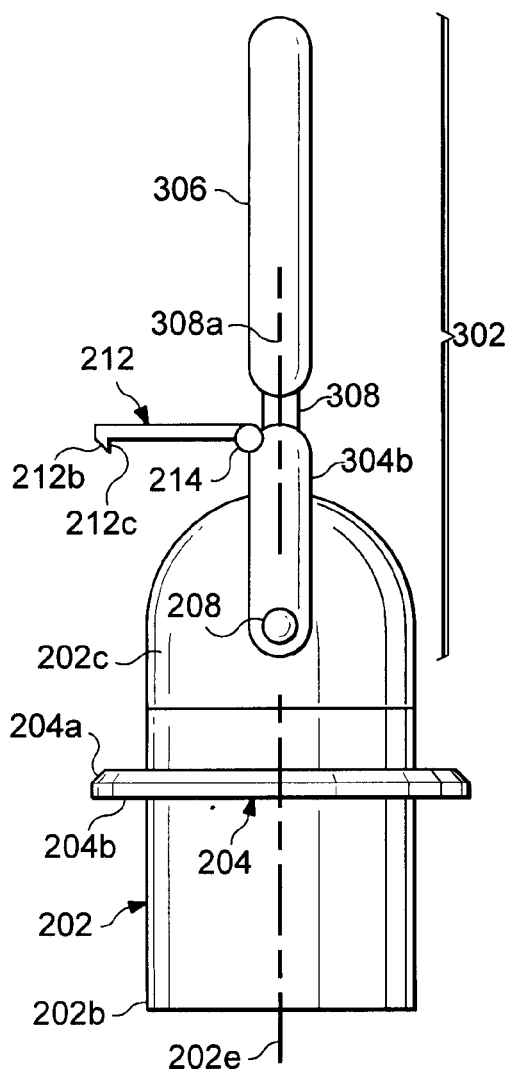
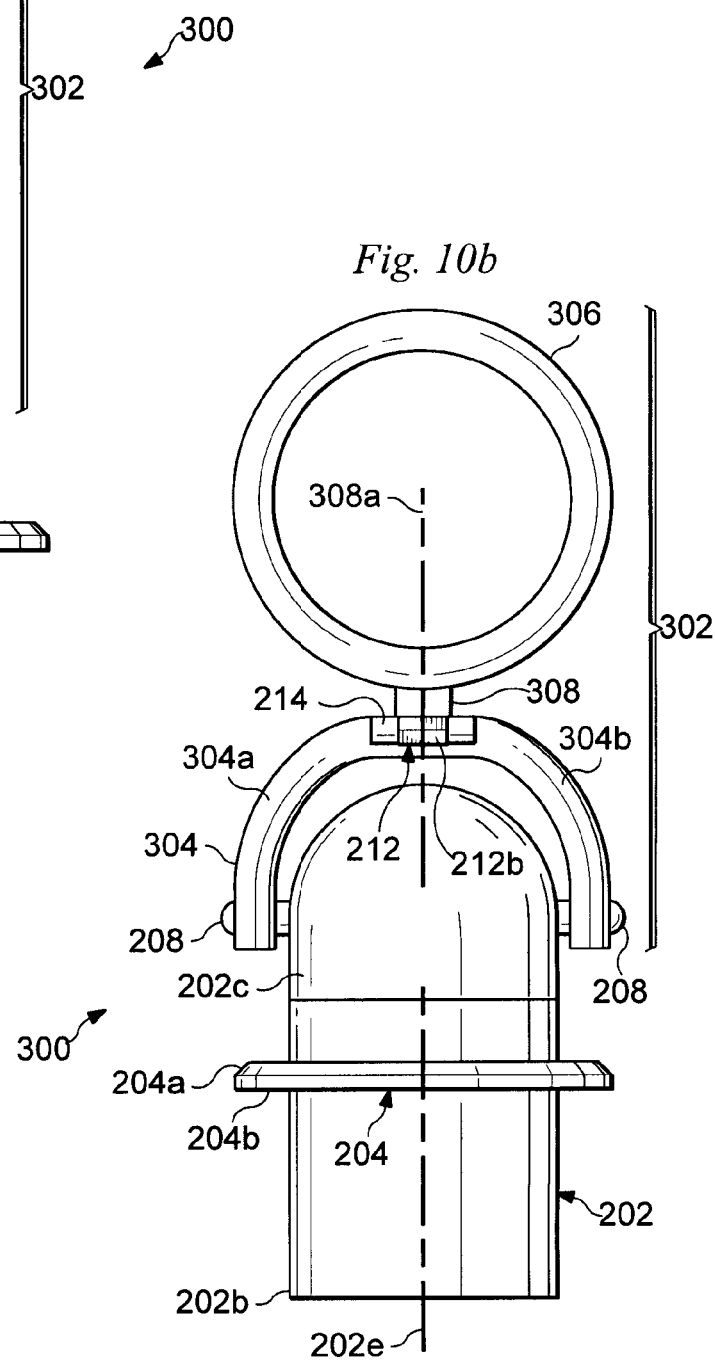

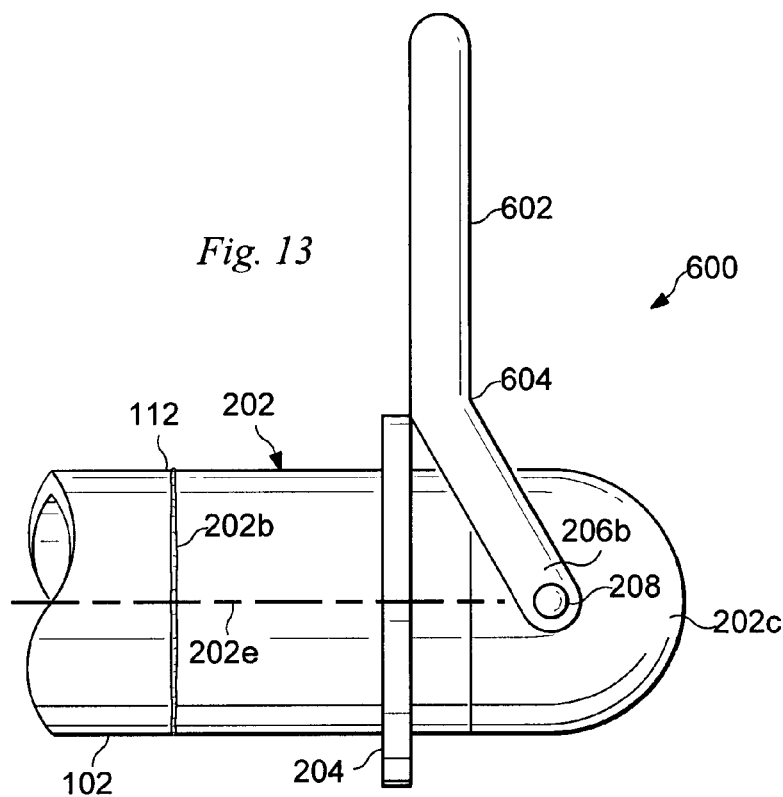
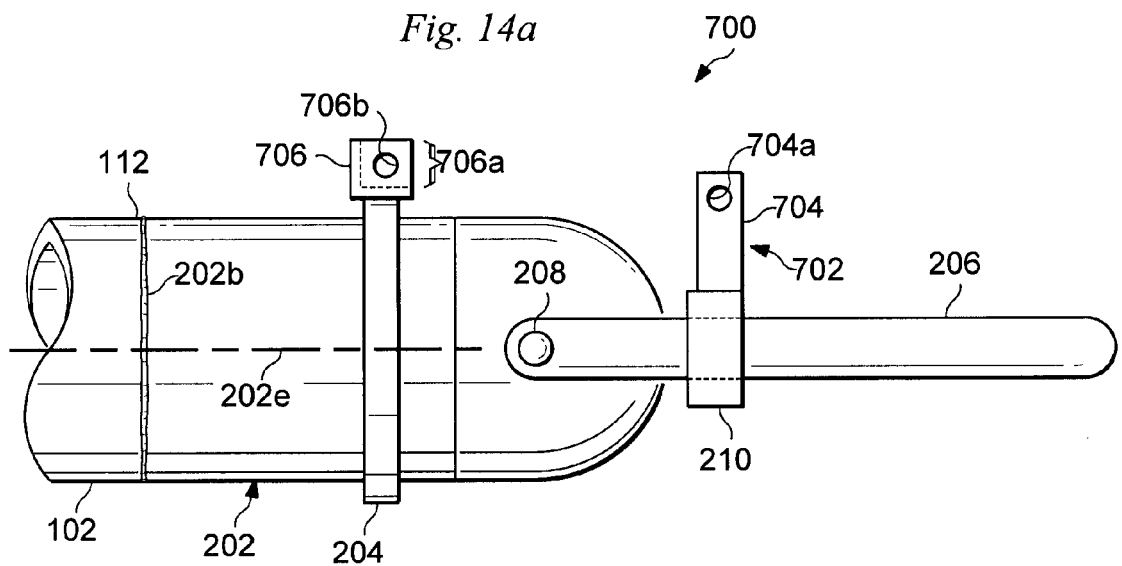

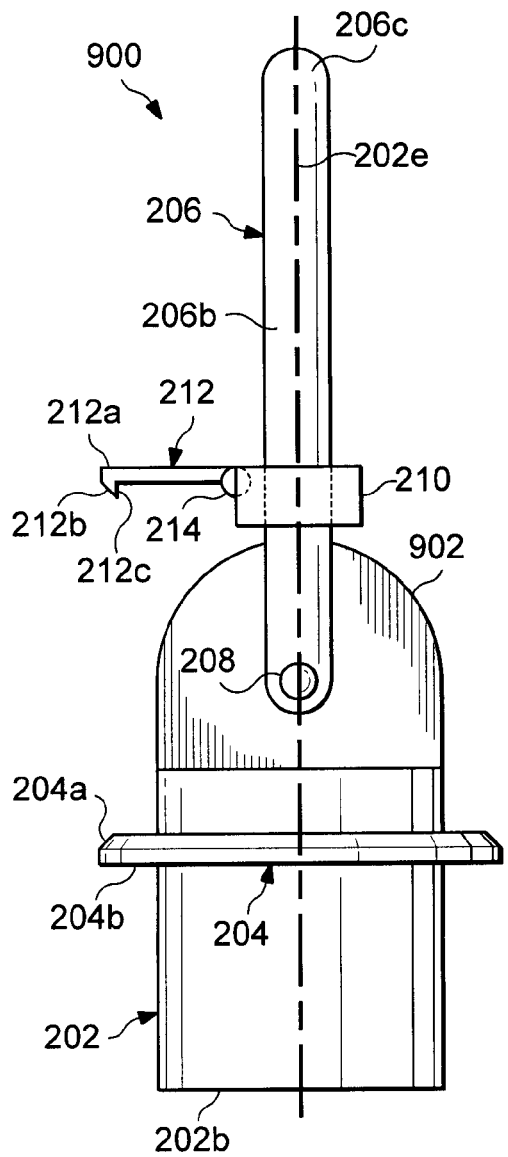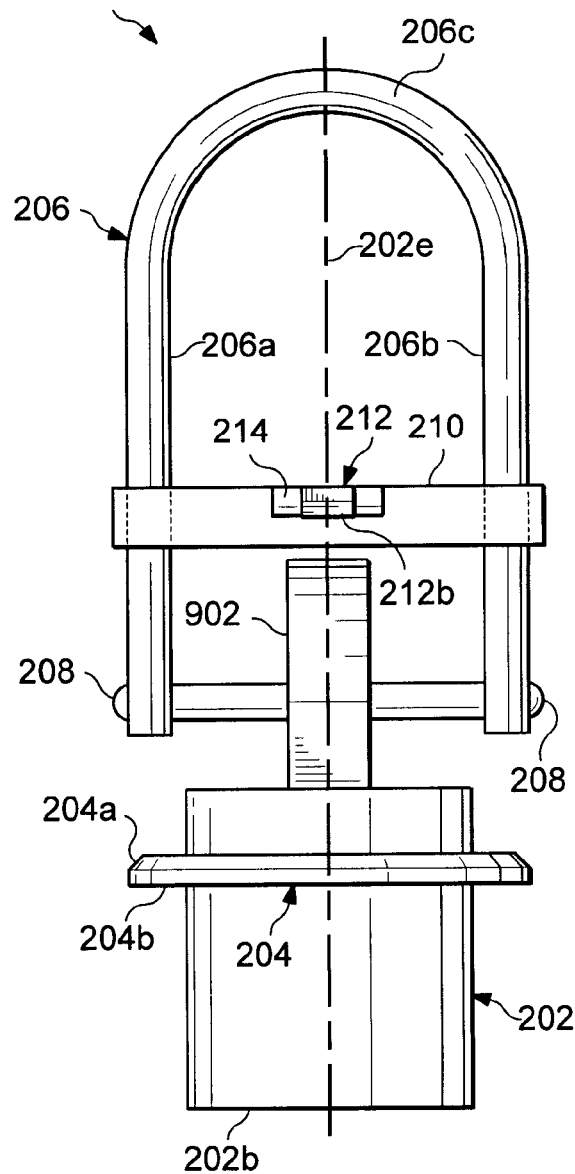

__US 7,182,550 B2__

ABANDONMENT AND RECOVERY HEAD APPARATUS

BACKGROUND

The disclosures herein relate generally to deep water pipeline construction and more particularly to an abandonment and recovery head apparatus for a pipeline.

When a pipeline must be abandoned from a pipelay vessel, an abandonment and recovery (A&R) head apparatus is welded to the end of the pipeline. A hook apparatus coupled to the vessel by a wire is connected to the A&R head apparatus, and the pipeline is lowered to the seabed by running wire off the vessel and down to the seabed until the A&R head apparatus is resting on the seabed.

The A&R head apparatus consists of an head welded to the end of the pipeline, with a lifting eye connected to the head. With the A&R head apparatus resting on the seabed, the lifting eye must be kept in a vertical position to enable detachment and reattachment of the hook apparatus to the lifting eye during abandonment and recovery of the pipeline. This is done by attaching a buoy to the lifting eye. A severe disadvantage of this lifting arrangement is that the buoy needed to keep the lifting eye vertical is long, heavy, and voluminous. The weight of the A&R head apparatus must be handled by the wire with hook apparatus. The length and the weight of the entire A&R head apparatus, hook apparatus, and wire are such that it is difficult and time consuming to line up the A&R head apparatus with the end of the pipeline and weld this connection to the pipeline when a pipe must be abandoned. The volume of the buoy is such that it is difficult and time consuming to pass the buoy by equipment on the vessel needed to lower or retrieve the pipeline.

Accordingly, it would be desirable to provide an abandonment and recovery head apparatus absent the disadvantages found in the prior methods discussed above.

SUMMARY

According to one aspect of the present invention, an abandonment and recovery head apparatus is provided that includes a head member, a lift member moveably coupled to the head member, and a retaining device operable to hold the lift member in an accessible position.

According to another aspect of the present invention, an abandonment and recovery head apparatus is provided that includes a head member, a lift member moveably coupled to the head member, the lift member moveable between a first position lying substantially along the axis of the head member and a second position substantially perpendicular to the axis of the head member, and a retaining device operable to hold the lift member in the second position through a direct connection between the retaining device and the head member.

According to another aspect of the present invention, a pipeline is provided that includes a head member coupled to a pipe, a lift member moveably coupled to the head member, and a retaining device operable to hold the lift member in an accessible position.

According to another aspect of the present invention, a method for abandoning and recovering a pipeline is provided that includes providing a head member having a coupling for attaching the head member to the pipeline, coupling a lift member on the head member, the lift member moveable between a first position and a second position, the second position being substantially perpendicular to the axis of the head member, and holding the lift member in the second position through contact between a retaining device and the head member.

According to another aspect of the present invention, a method for abandoning and recovering a pipeline is provided that includes providing a pipeline, coupling a head member to an end of the pipeline, coupling a lift member on the head member, the lift member moveable between a first position and a second position, the second position being substantially perpendicular to the axis of the head member, and holding the lift member in the second position through contact between a retaining device and the head member.

According to another aspect of the present invention, an abandonment and recovery head apparatus is provided that includes a head member, a lift member moveably coupled to the head member, and a means for holding the lift member in an accessible position.

According to another aspect of the present invention, an abandonment and recovery head apparatus is provided that includes a tubular head member including a retaining section on its surface. A shackle lift member is moveably coupled to the tubular head member by at least one pin, the shackle lift member including a plurality of arms coupled to the at least one pin and an arcuate section joining the plurality of arms. A latch member support structure is coupled to and spans the plurality of arms. A latch member is moveably coupled to the latch member support structure on a hinge, the latch member operable to hold the shackle lift member in an accessible position through contact with the retaining section.

According to another aspect of the present invention, an abandonment and recovery head apparatus is provided that includes a tubular head member including a retaining section on its surface. An arcuate support member is moveably coupled to the tubular head member by at least one pin. A ring lift member is rotatably coupled to the arcuate support member. A latch member support structure is coupled to the arcuate support member. A latch member is moveably coupled to the latch member support structure on a hinge, the latch member operable to hold the shackle lift member in an accessible position through contact with the retaining section.

According to another aspect of the present invention, an abandonment and recovery head apparatus is provided that includes a tubular head member including a retaining section on its surface. A shackle lift member is moveably coupled to the tubular head member by at least one pin, the shackle lift member including a plurality of arms coupled to the at least one pin and an arcuate section joining the plurality of arms. A spring member support structure is coupled to and spans the plurality of arms. A spring member is coupled to the spring member support structure and the retaining section, the spring member operable to hold the shackle lift member in an accessible position.

According to another aspect of the present invention, an abandonment and recovery head apparatus is provided that includes a tubular head member including a retaining section on its surface. A shackle lift member is moveably coupled to the tubular head member by at least one pin, the shackle lift member including a plurality of arms coupled to the at least one pin and an arcuate section joining the plurality of arms. A hydraulic member support structure is coupled to and spans the plurality of arms. A hydraulic member is coupled to the hydraulic member support structure and the retaining section, the hydraulic member operable to hold the shackle lift member in an accessible position.

According to another aspect of the present invention, an abandonment and recovery head apparatus is provided that includes a tubular head member including a retaining section on its surface. A shackle lift member is moveably coupled to the tubular head member by at least one pin, the shackle lift member including a plurality of arms coupled to the at least one pin and an arcuate section joining the plurality of arms. A bend in the arms is provided such that the shackle lift member may be supported by the retaining section while being held in an accessible position.

According to another aspect of the present invention, an abandonment and recovery head apparatus is provided that includes a tubular head member including a retaining section on its surface. A shackle lift member is moveably coupled to the tubular head member by at least one first pin, the shackle lift member including a plurality of arms coupled to the at least one first pin and an arcuate section joining the plurality of arms. A retaining member support structure is coupled to and spans the plurality of arms. A retaining member is coupled to the retaining member support structure, the retaining member defines a first pin receiving channel. A securing member is coupled to the retaining section, the securing member defines a retaining member receiving channel and a second pin receiving channel. A second pin is operable to hold the shackle lift member in an accessible position when the retaining member is situated in the retaining member receiving channel and the second pin is placed in the first pin receiving channel and the second pin receiving channel.

According to another aspect of the present invention, a method for abandoning and recovering a pipeline is provided that includes providing a pipeline situated beneath a body of water, providing a head member having a coupling for attaching the head member to the pipeline, coupling a lift member on the head member, the lift member moveable between a first position and a second position, the second position being substantially perpendicular to the axis of the head member, holding the lift member in the second position through contact between a retaining device and the head member, and releasing the retaining device and allowing the lift member to move to the first position.

According to another aspect of the present invention, an abandonment and recovery head apparatus is provided that includes a head member including a retaining means on its surface, a lift member including a pivoting means for pivotally coupling the lift member to the head member, and means for holding the lift member in an accessible position through contact with the retaining means, whereby the means for holding the lift member in an accessible position through contact with the retaining means includes a means for pivotally coupling the means for holding the lift member in an accessible position through contact with the retaining means to the lift member.

BRIEF DESCRIPTION OF THE DRAWINGS

FIG. 6b is a front view illustrating an embodiment of the head apparatus of FIG. 6a.

FIG. 6c is a cross sectional view illustrating an embodiment of the head apparatus of FIG. 6a.

FIG. 6d is a cross sectional view illustrating an embodiment of the head apparatus of FIG. 6a FIG. 7 is a side view illustrating an embodiment of the head apparatus of FIG. 6a in operation.

FIG. 8a is a partial view illustrating an embodiment of the head apparatus of FIG. 6a.

FIG. 8b is a partial view illustrating an embodiment of the head apparatus of FIG. 6a.

FIG. 8c is a partial view illustrating an embodiment of the head apparatus of FIG. 6a.

FIG. 9a is a side view illustrating an embodiment of the head apparatus of FIG. 6a during pipeline abandonment or recovery.

FIG. 9b is a side view illustrating an embodiment of the head apparatus of FIG. 6a during pipeline abandonment or recovery.

FIG. 10a is a side view illustrating an embodiment of a head apparatus.

FIG. 10b is a front view illustrating an embodiment of the head apparatus of FIG. 10a.

FIG. 13 is a side view illustrating an embodiment of a head apparatus.

FIG. 14a is a side view illustrating an embodiment of a head apparatus including a pin and hole retention member.

FIG. 14b is a top view illustrating an embodiment of the head apparatus of FIG. 14a.

FIG. 14c is a side view illustrating an embodiment of the head apparatus of FIG. 14a.

FIG. 15b is a cross sectional view illustrating an embodiment of the head apparatus of FIG. 15a.

FIG. 16a is a side view illustrating an embodiment of a head apparatus.

FIG. 16b is a front view illustrating an embodiment of the head apparatus of FIG. 16a.

DETAILED DESCRIPTION

Figure 1A:
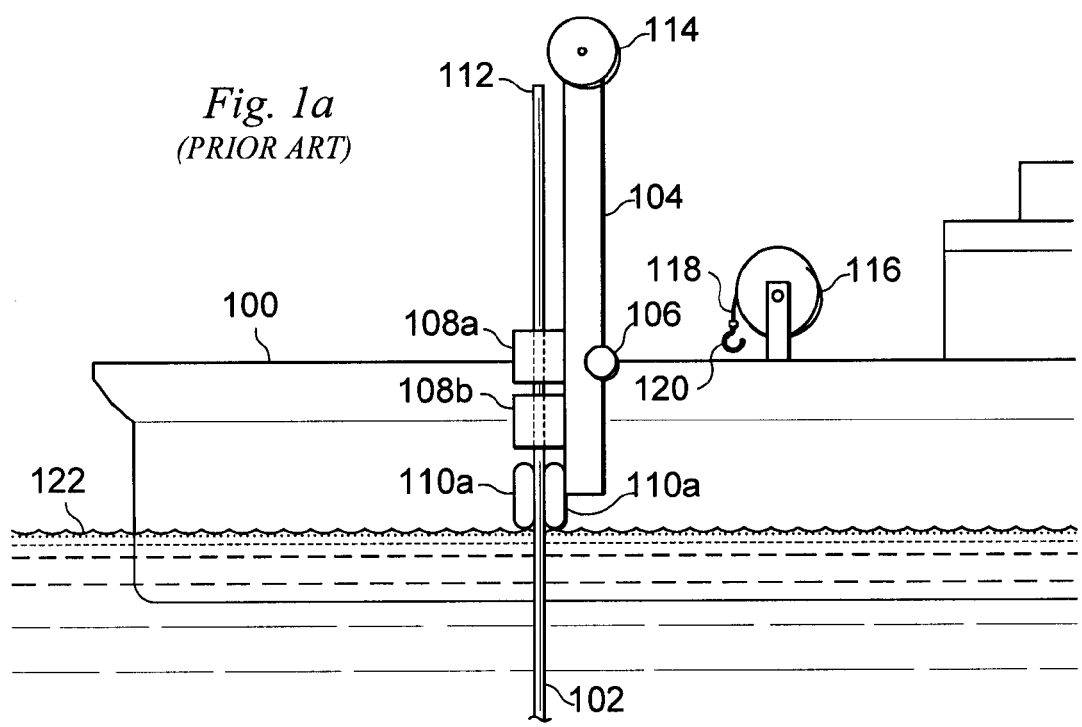
FIG. 1a is a side view illustrating an embodiment of a conventional J-lay vessel.
Figure 1B:
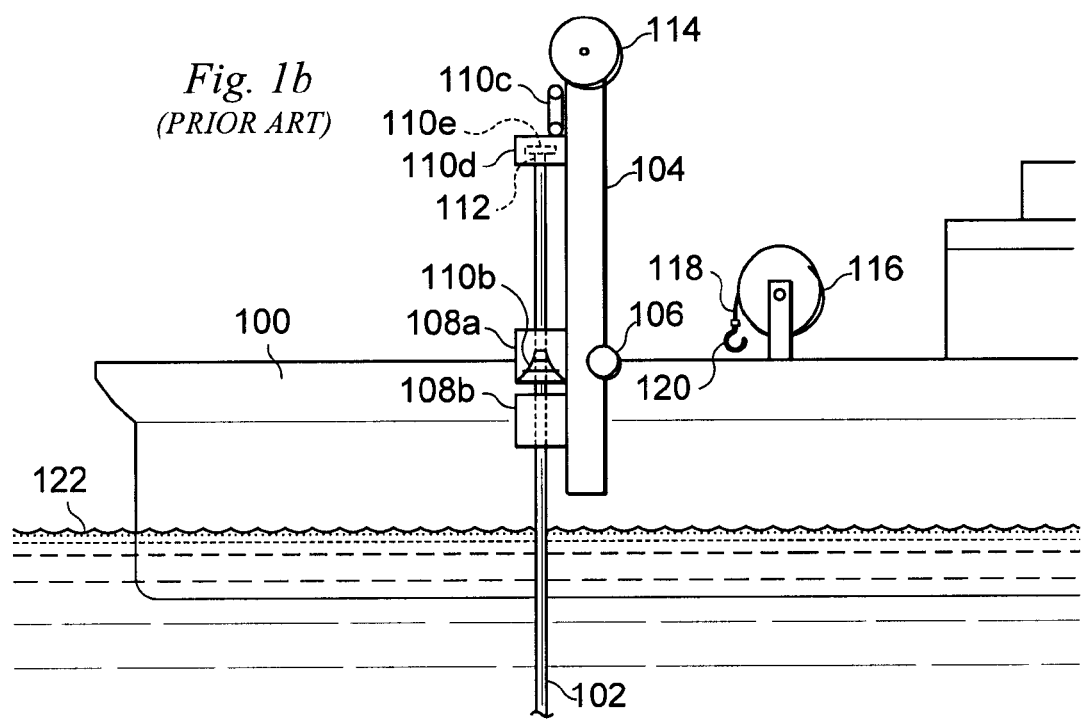
FIG. 1b is a side view illustrating an embodiment of a conventional J-lay vessel.

Referring to FIGS. 1a and 1b of the drawings, a conventional J-lay vessel 100 is illustrated. Vessel 100 is used for constructing a conventional pipeline 102. Vessel 100 includes a construction ramp 104 pivotally coupled to the vessel 100 on a hinge 106. A plurality of conventional working stations 108a and 108b are coupled to the ramp 104. Coupled to the vessel is a conventional suspension system such as a set of conventional tensioners 110a, as illustrated in FIG. 1a, or a conventional hang off table 110b along with a conventional hoisting system 110c and a conventional head clamp 110d for pipelines with a conventional collar 110e on a pipeline end 112, as illustrated in FIG. 1b. A conventional sheave 114 is coupled to the construction ramp 104, and a conventional winch 116 is coupled to the vessel 100. The winch 116 includes a length of wire 118 with a hook 120 attached to the wire 118. Vessel 100 operates on a body of water 122.

Figure 2A:
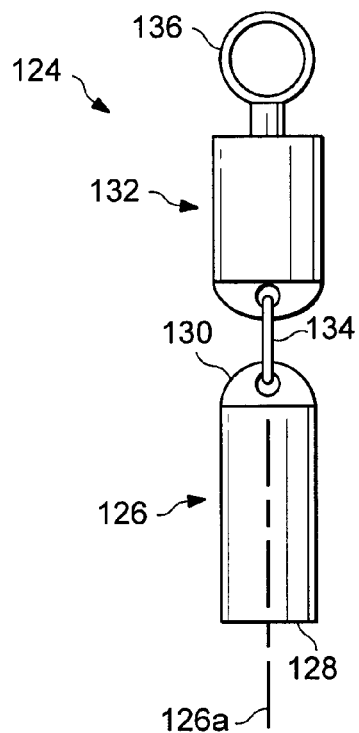
FIG. 2a is a side view illustrating an embodiment of a conventional abandonment and recovery head apparatus.
Figure 2B:
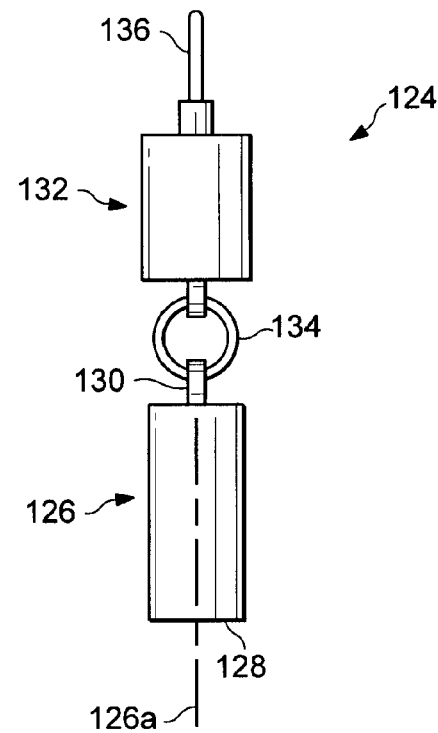
FIG. 2b is a front view illustrating an embodiment of a conventional abandonment and recovery head apparatus.

Referring to FIGS. 2a and 2b, a conventional head apparatus 124 includes a head member 126 with a head member longitudinal axis 126a, a pipeline attachment end 128, and a head apparatus lifting eye 130. A buoy 132 is moveably coupled to the head member 126 through a connecting member 134 attached to the buoy 132 and the head apparatus lifting eye 130. The buoy 132 includes a buoy lifting eye 136 coupled to an upper portion of the buoy 132.

In operation, as illustrated in FIGS. 1a and 1b, the construction ramp 104 may be rotated to a substantially vertical position, allowing the weight of pipeline 102 in the body of water 122 to be supported by the suspension system 110 on the construction ramp 104. Pipeline 102 may then be constructed on the ramp 104 in working station 108a and working station 108b.

During construction of the pipeline 102, the pipeline 102 may be held stationary or moved along the construction ramp 104 using the set of tensioners 110a, as illustrated in FIG. 1a. Alternatively, for pipeline 102 with collar 110e, as illustrated in FIG. 1b, the pipeline 102 may be held stationary in the hang off table 110b. The pipeline 102 may be moved along the construction ramp 104 by opening the hang-off table 110b and using the hoisting system 110c attached to the collar 110e of the pipeline 102 via a head clamp 110d to adjust the position of the pipeline 102.

When the pipeline 102 must be abandoned, as illustrated in FIGS. 1a, 1b, 2a, 2b, 3a, and 3b, the head apparatus 124 is attached to the pipeline 102 on the construction ramp 104 by welding the pipe attachment end 128 on head member 126 to pipeline end 112. A length of the wire 118 with hook 120 is released from winch 116 and run over sheave 114. Hook 120 is connected to buoy lifting eye 136 on head apparatus 124.

Figure 4:
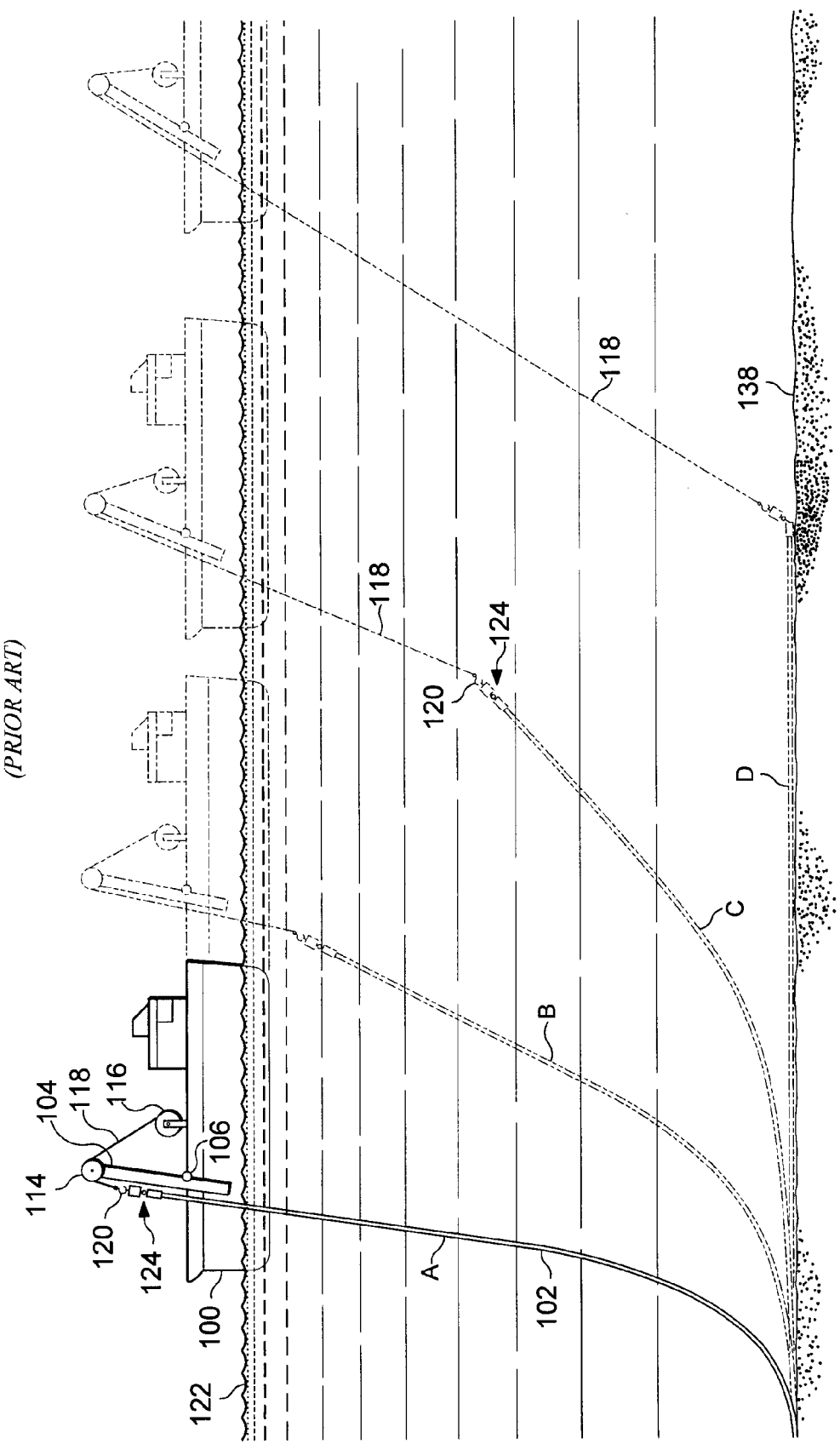
FIG. 4 is a side view illustrating an embodiment of a conventional J-lay vessel abandoning a pipeline on a seabed.
Figure 6A:
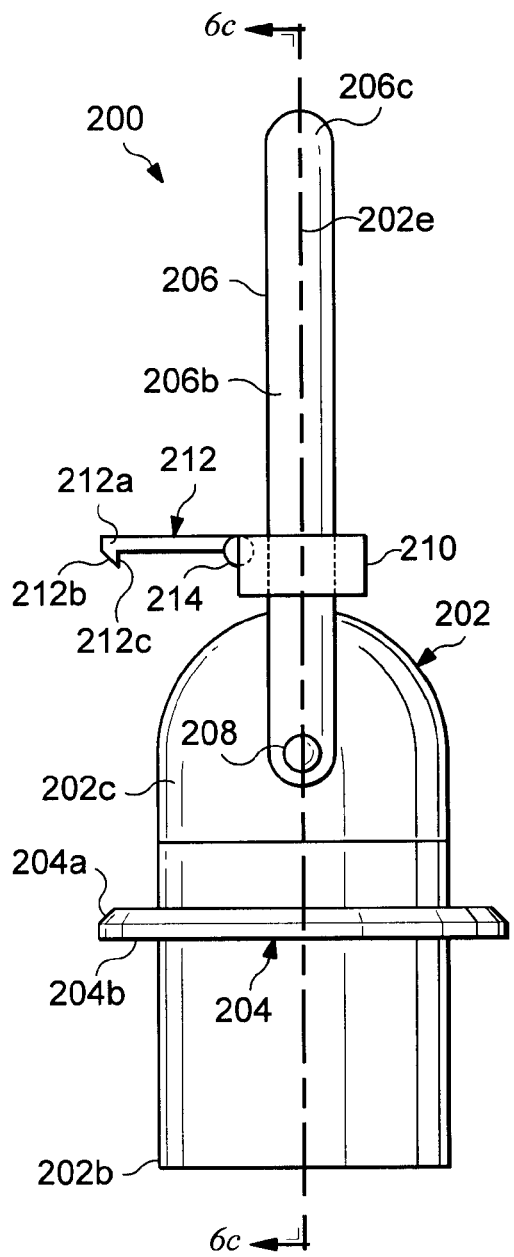
FIG. 6a is a side view illustrating an embodiment of a head apparatus.
Figure 6B:
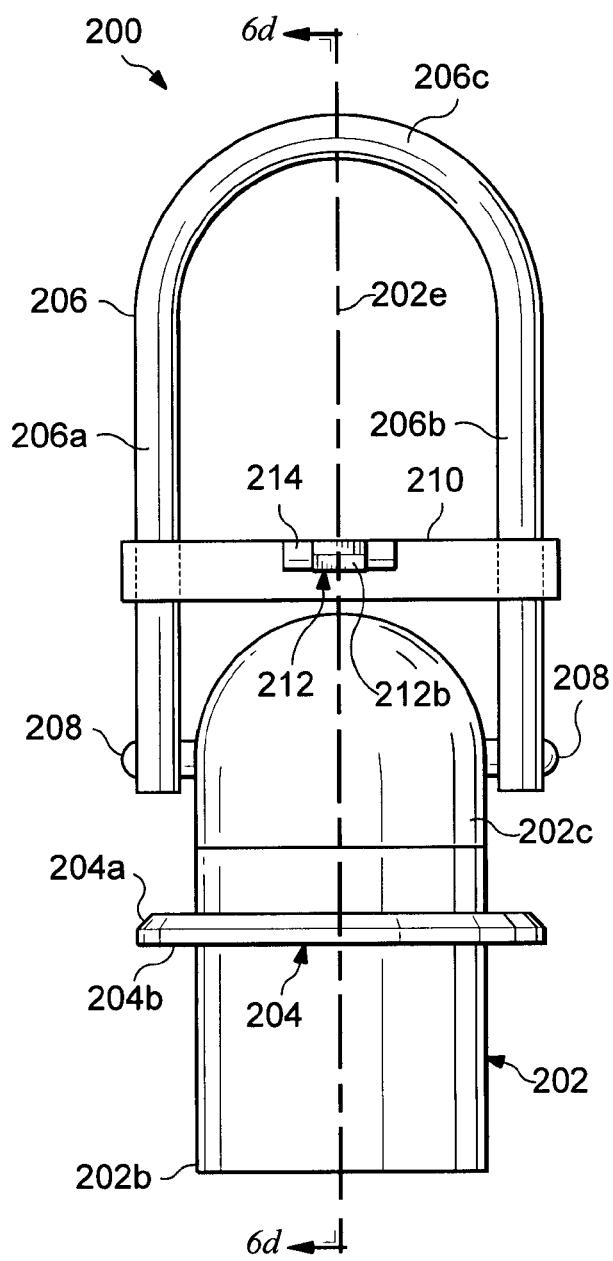

Referring now to FIGS. 2a, 2b, and 4, the pipeline 102 may be lowered through positions A, B, C, and D into the body of water 122 onto a seabed 138 by spooling the wire 118 off the winch 116. During lowering, positions A, B, and C, connection member 134 allows the buoy lifting eye 136 to move with respect to the head member 126, which allows the buoy lifting eye 136 to lie along head member longitudinal axis 126a when the head apparatus 124 is on the vessel 100, and to rotate in order to be substantially perpendicular to the head member longitudinal axis 126a as the head apparatus 124 nears the seabed 138. The vessel 100 is moved and the construction ramp 104 is rotated during the lowering of pipeline 102 in order to keep the pipeline 102 in the body of water 122 from buckling under its own weight as it nears the seabed 138. With the pipeline 102 laid on the seabed 138, position D, the hook 120 may be released from buoy lifting eye 136 on head apparatus 124, and the wire 118 may be brought back to the vessel 100 by respooling it on the winch 116, in order to abandon pipeline 102.

Figure 3A:
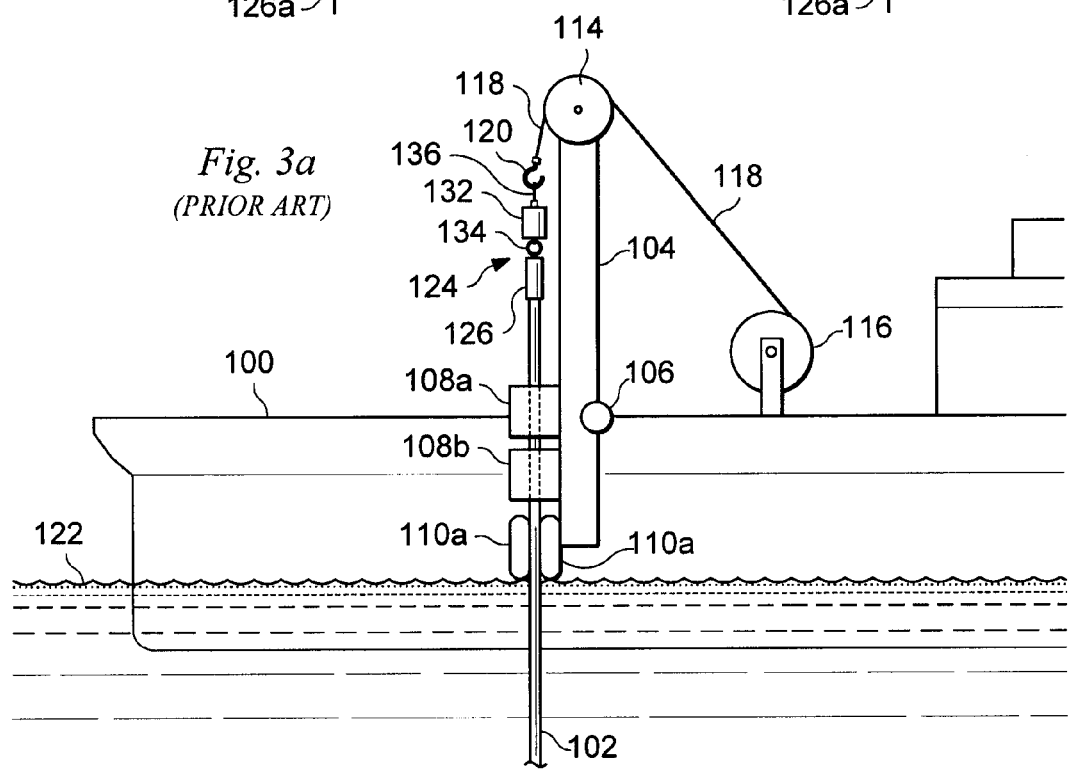
FIG. 3a is a side view illustrating an embodiment of a conventional J-lay vessel with a conventional abandonment and recovery head apparatus attached to a pipeline.
Figure 3B:
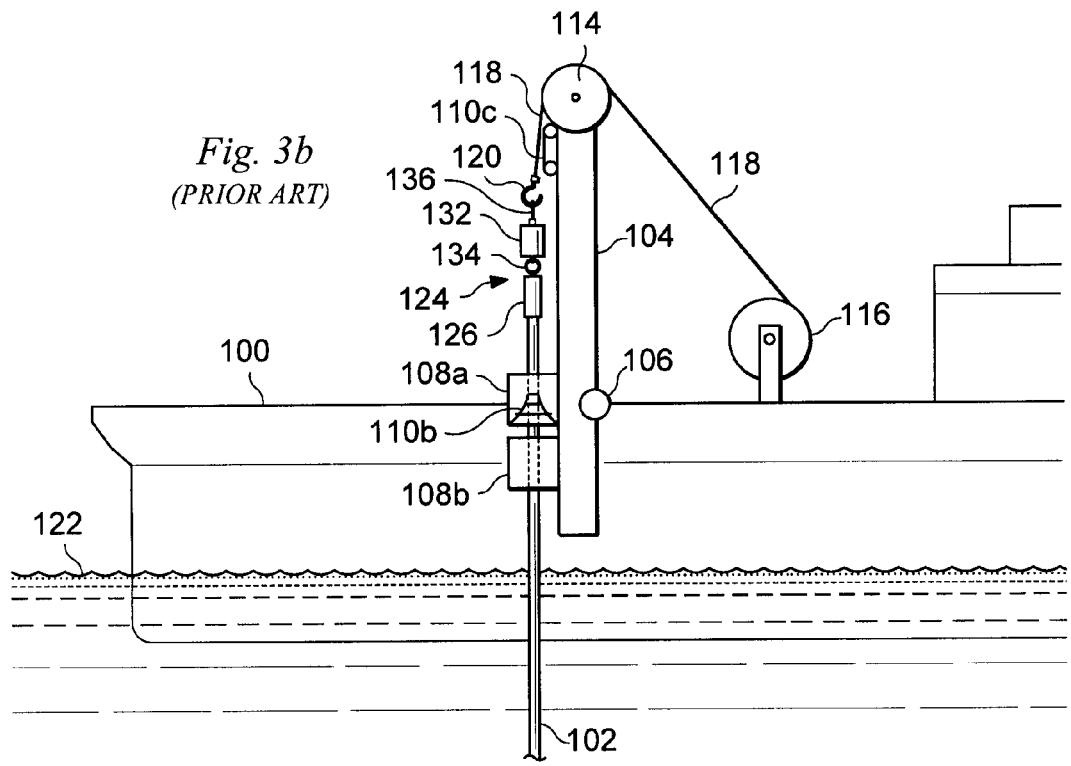
FIG. 3b is a side view illustrating an embodiment of a conventional J-lay vessel with a conventional abandonment and recovery head apparatus attached to a pipeline.
Figure 5A:
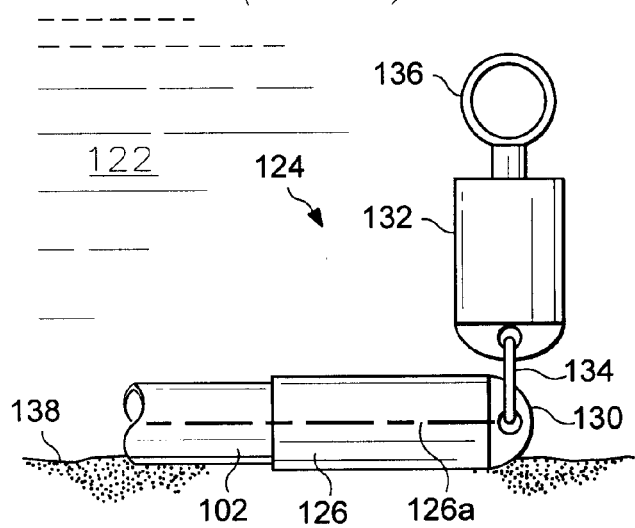
FIG. 5a is a side view illustrating an embodiment of a conventional abandonment and recovery head apparatus attached to a pipeline on the seabed.
Figure 5B:
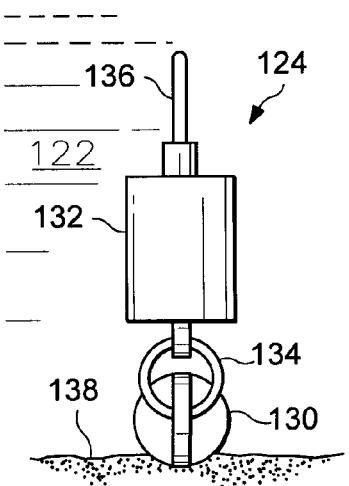
FIG. 5b is a front view illustrating an embodiment of a conventional abandonment and recovery head apparatus attached to a pipeline on the seabed.

Referring now to FIGS. 5a and 5b, when the pipeline 102 is abandoned, it lays at the bottom of the body of water 122 and on the seabed 138 along with the head member 126 on head apparatus 124. The buoyant force exerted by buoy 132 holds the buoy lifting eye 136 in an accessible position, such as the position shown with the buoy lifting eye 136 held substantially vertical with respect to the head member 126 and substantially perpendicular with respect to the head member longitudinal axis 126a. The accessible position makes detachment and reattachment of the hook 120, as illustrated in FIGS. 3a, 3b, and 4, during abandonment and recovery simpler, as without the buoy 132, the buoy lifting eye 136 would fall to the seabed 138 and could even sink into the soft seabed deposits, making it very difficult the recover the pipeline 102.

However, the conventional head apparatus 124, as illustrated in FIGS. 2a, 2b, 3a, 3b, 4, 5a, and 5b, suffers from the disadvantage of being long, heavy, and voluminous. The weight of these conventional head apparatuses 124 must be handled by the wire 118 and hook 120 combination. The length and weight of the head apparatus 124 along with the wire 118 and hook 120 make it difficult and time consuming to line up the head member 126 with the pipeline end 112 and weld the two together on the construction ramp 104 when the pipeline 102 must be abandoned. The volume of buoy 132 makes it difficult and time consuming to get the head apparatus 124 through the suspension system, such as the set of tensioners 110a or the hang-off table 110b, when the pipeline 102 is being lowered during abandonment or retrieved during recovery.

Referring to FIGS. 6a, 6b, 6c, and 6d, an exemplary embodiment of a head apparatus 200 includes a tubular head member 202 defining a cavity 202a that includes a tubular pipeline weld portion 202b at one end, a solid head member lifting eye 202c defining a channel 202d at another end, and a head member longitudinal axis 202e. A tubular retaining section 204 is coupled to, and extends in a perpendicular direction from, the exterior surface of the tubular head member 202, between the head member lifting eye 202c and the pipeline weld portion 202b, that may, for example, include a beveled exterior surface 204a on one end and a retaining surface 204b on another end. A shackle lift member 206 includes an arm 206a having an end that is pivotally coupled to one side of the head member lifting eye 202c by a pin 208, an arm 206b having an end that is pivotally coupled to another side of the head member lifting eye 202c by pin 208, and a arcuate section 206c that spans and is coupled to the other ends of the arms 206a and 206b. Pin 208 is partially situated in channel 202d. A retaining member support 210 spans, extends transversely with respect to, and is coupled to the arms 206a and 206b of the shackle lift member 206. A retaining member 212 includes an end having a hook member 212a that includes a beveled surface 212b and a retaining surface 212c, the retaining member 212 extending transversely with respect to and pivotally coupled to the retaining member support 210 by a hinge 214. In an exemplary embodiment, solid head member lifting eye 202c has a hemispherical shape. In an exemplary embodiment, the tubular retaining section 204 may, for example, not include the beveled exterior surface 204a.

In operation, as illustrated in FIGS. 4, 6a, 6b, 7, 8a, 8b, and 8c, head apparatus 200 is coupled to pipeline 102 by welding tubular pipeline weld portion 202b on tubular head member 202 to the pipeline end 112. As the pipeline 102 begins to be lowered from a vessel, such as vessel 100, shackle lift member 206 will be in a position A, lying substantially along head member longitudinal axis 202e. As the pipeline gets closer to the seabed 138, shackle lift member 206 will rotate about pin 208, towards a position B.

As shackle lift member 206 approaches position B, retaining member 212 is brought towards tubular retaining section 204 on tubular head member 202. Further rotation of shackle lift member 206 brings beveled surface 212b on retaining member 212 into contact with tubular retaining section 204. Hinge 214 allows retaining member 212 to be displaced around retaining section 204. Bringing shackle lift member 206 into position B brings retaining surface 212c into contact with retaining surface 204b and locks shackle lift member 206 in position B. In an exemplary embodiment, beveled exterior surface 204a on retaining section 204 may, for example, be included to assist in allowing retaining member 212 to be displaced around retaining section 204.

Figure 7:
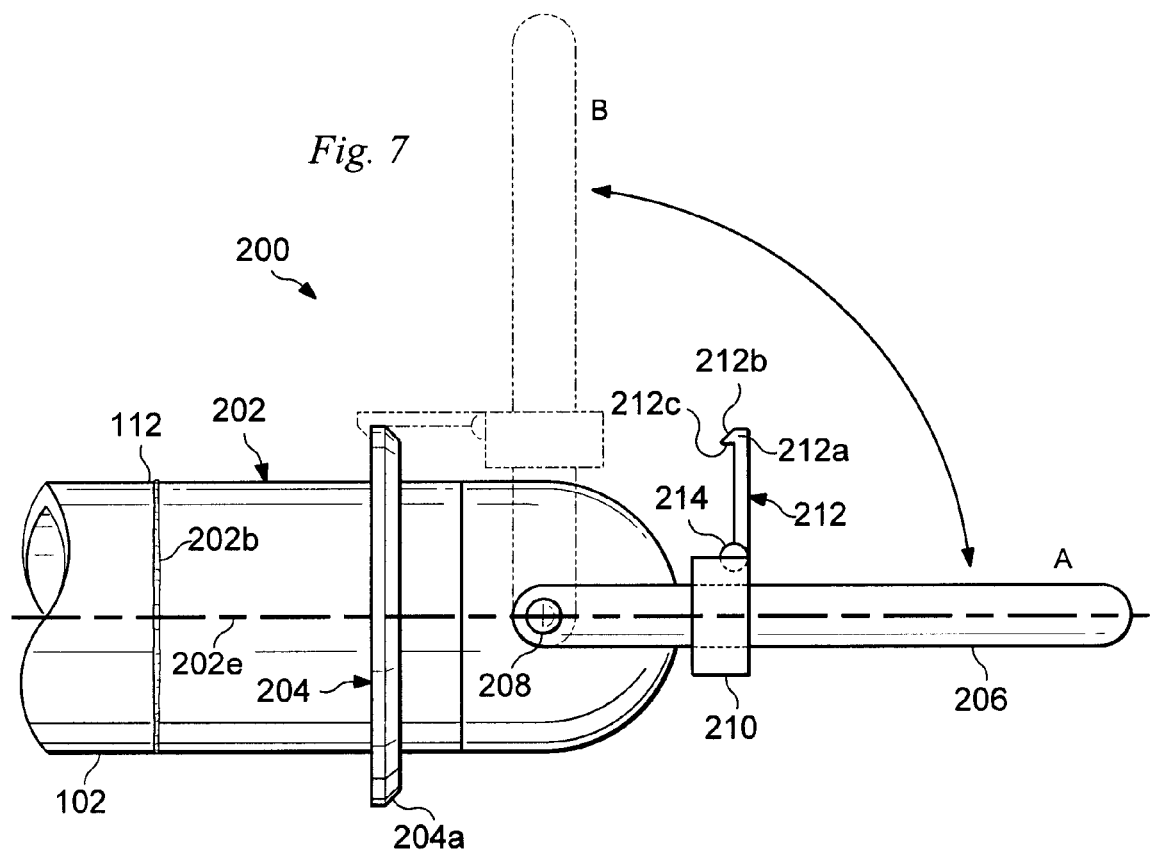
Figure 8A:
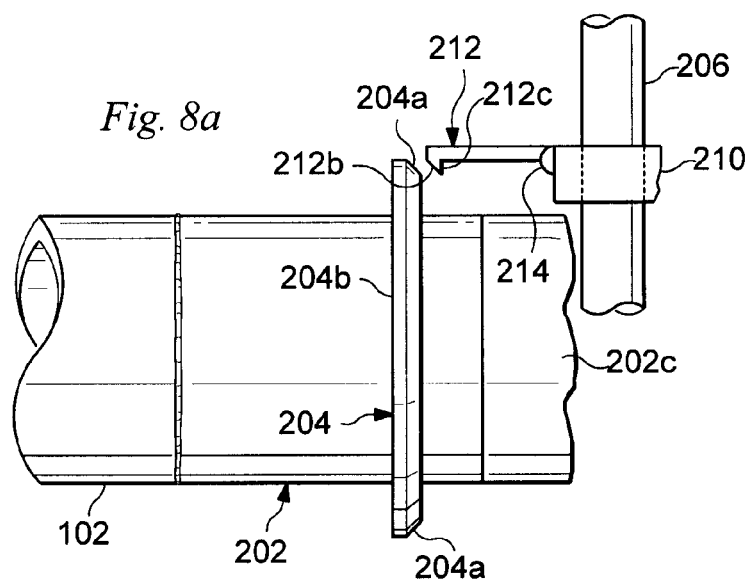
Figure 8B:
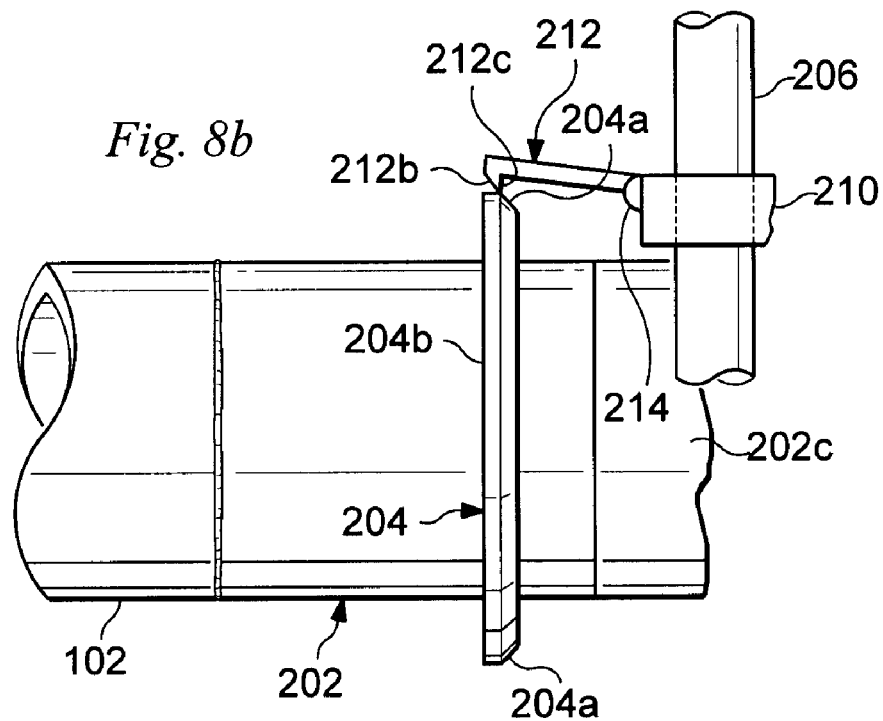
Figure 8C:
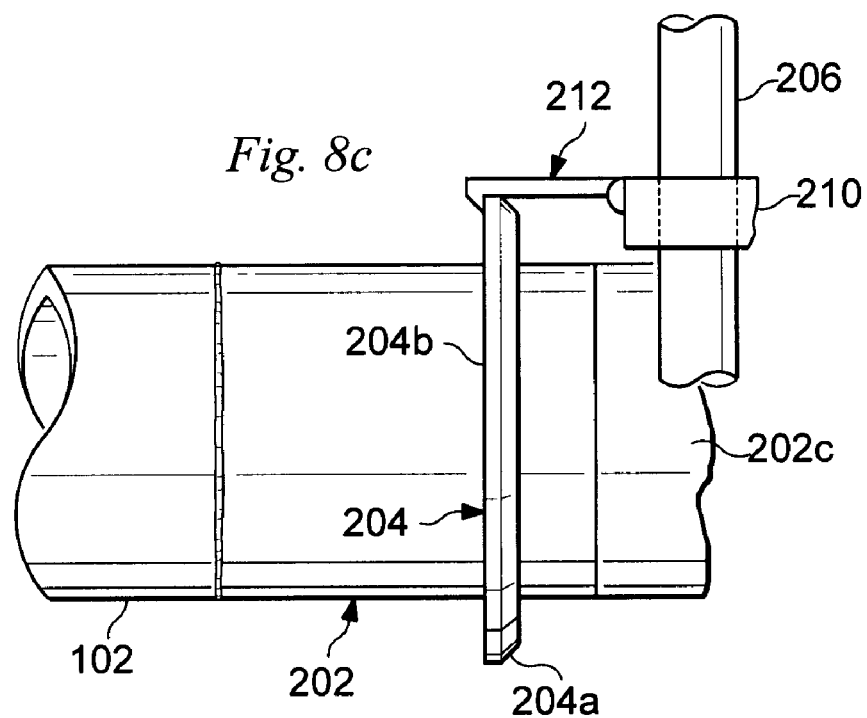

Referring now to FIG. 7, with shackle lift member 206 locked in position B, shackle lift member 206 is held in an accessible position. In an exemplary embodiment, the accessible position, such as position B, is substantially vertical with respect to tubular head member 202, and substantially perpendicular to head member longitudinal axis 202e. However, the accessible position may include a variety of positions, other than position B, that hold the shackle lift member 206 substantially above the tubular head member 202 such that when the tubular head member 202 is resting on the seabed 138, as illustrated in FIGS. 9a and 9b, the shackle lift member 206 may be easily engaged by the hook 120. The accessible position, such as position B as illustrated in FIG. 7, provides quick disconnection of the wire 118 and hook 120 combination during abandonment of pipeline 102, as allowing slack in the wire 118 will cause the hook 120 to disengage the shackle lift member 206. The accessible position, such as position B as illustrated in FIGS. 7, also provides quick connection of the wire 118 and hook 120 combination during recovery of pipeline 102, as the shackle lift member 206 is held substantially vertical from the seabed 138, making engagement of the wire 118 and hook 120 combination and the shackle lift member 206 relatively simple. Once the hook 120 engages the shackle lift member 206, as illustrated in FIG. 9a, a conventional remotely operated vehicle (ROV) may be used to release retaining member 212 from tubular retaining section 204. Then, by putting tension in wire 118, the shackle lift member 206 may be rotated to a position C, as illustrated in FIG. 9b, which is an intermediate position between position B and position A, and the pipeline 102 may be recovered. During recovery, shackle lift member 206 is released from position B and rotated to a position C as the pipeline 102 is first brought up from the seabed 138. As the pipeline 102 is brought up through body of water 122, shackle lift member 206 rotates towards position A until position A is achieved when the pipeline 102 approaches vessel 100.

Referring now to FIGS. 10a and 10b, an alternative embodiment of a head apparatus 300 is substantially identical in design and operation to head apparatus 200 described above with reference to FIGS. 6a, 6b, 7, 8a, 8b, 8c, 9a, and 9b, with provision of a ring lift member 302 replacing shackle lift member 206 and retaining member support 210. Ring lift member 302 is pivotally coupled to tubular head member 202 by pin 208. Ring lift member 302 includes an arcuate support 304 with an arm 304a that is pivotally coupled to one side of the head member lifting eye 202c by pin 208, and an arm 304b that is pivotally coupled to another side of the head member lifting eye by pin 208. A lift ring 306 is rotatably coupled to arcuate support 304 through a connection member 308, the connection member 308 having a connection member longitudinal axis 308a. Retaining member 212 is pivotally coupled to arcuate support 304 through hinge 214.

In an exemplary embodiment, during operation of head apparatus 300, lift ring 306 may rotate on connection member 308 about connection member longitudinal axis 308a.

Figure 11:
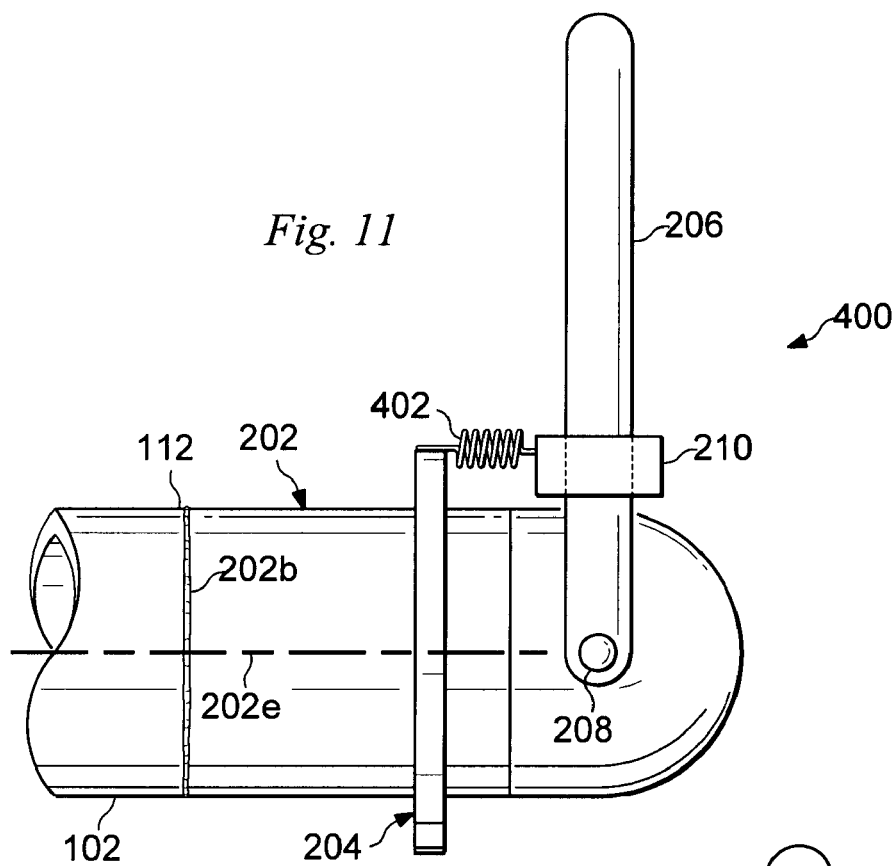
FIG. 11 is a side view illustrating an embodiment of a head apparatus including a spring retention member.

Referring now to FIG. 11, an alternative embodiment of a head apparatus 400 is substantially identical in design and operation to head apparatus 200 described above with reference to FIGS. 6a, 6b, 7, 9a, and 9b, with provision of a spring retaining member 402 replacing retaining member 212. Spring retaining member 402 has one end coupled to tubular retaining section 204, and another end coupled to retaining member support 210.

In an exemplary embodiment, during operation of head apparatus 400, the spring retaining member 402 will allow shackle lift member 206 to be rotated about pin 208 until it lies substantially along head member longitudinal axis 202e, such as during abandonment and recovery of the pipeline 102. When the pipeline 102 is abandoned, spring retaining member 402 will exert a force on shackle lift member 206, holding it in an accessible position, similar to position B as illustrated in FIG. 7.

Spring retaining member 402 may be a spiral spring or an elastic element coupled to a section of shackle lift member 206 and tubular retaining section 204 on tubular head member 202. The force applied by spring retaining member 402 should be such that the shackle lift member 206 is held in the accessible position under it own weight plus the impact from the wire 118 and hook 120 combination during engagement for recovery, but is allowed to rotate when the pipeline 102 is lifted or lowered during abandonment and recovery.

Figure 12:
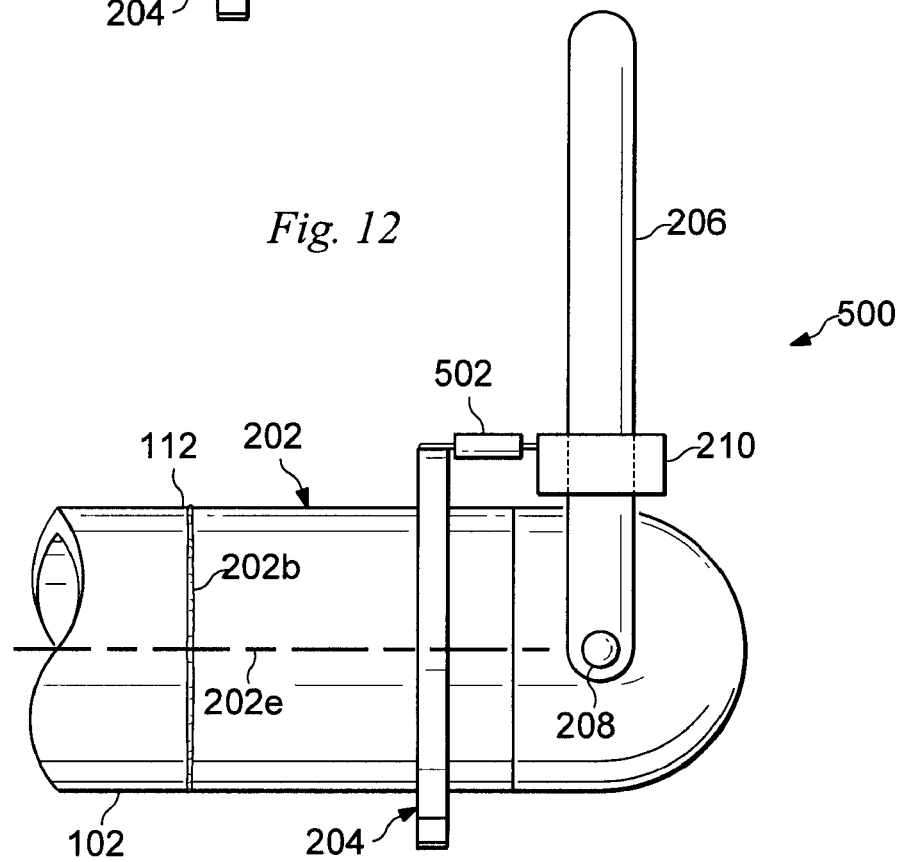
FIG. 12 is a side view illustrating an embodiment of a head apparatus including a hydraulic retention member.
Figure 14B:
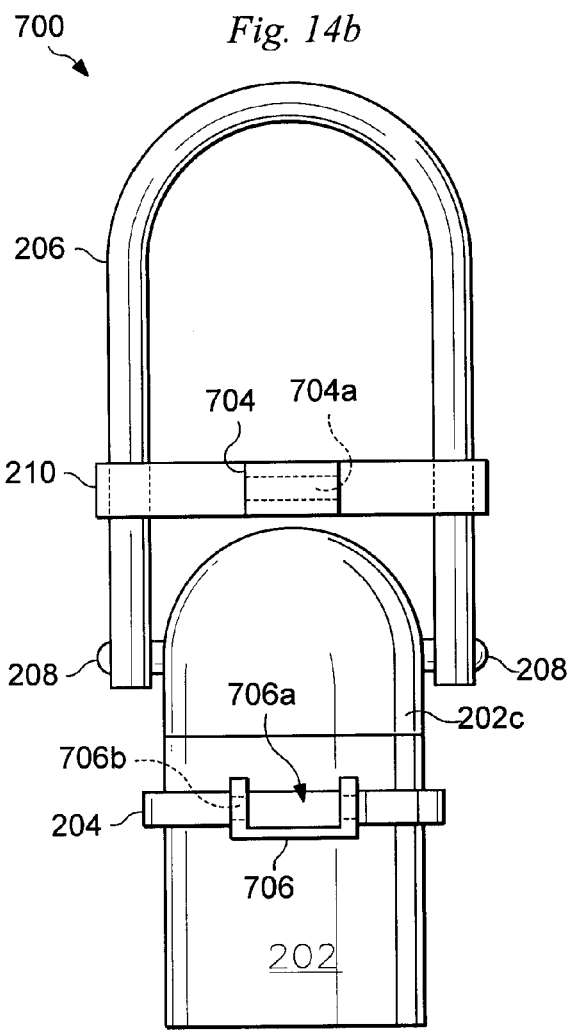
Figure 14C:
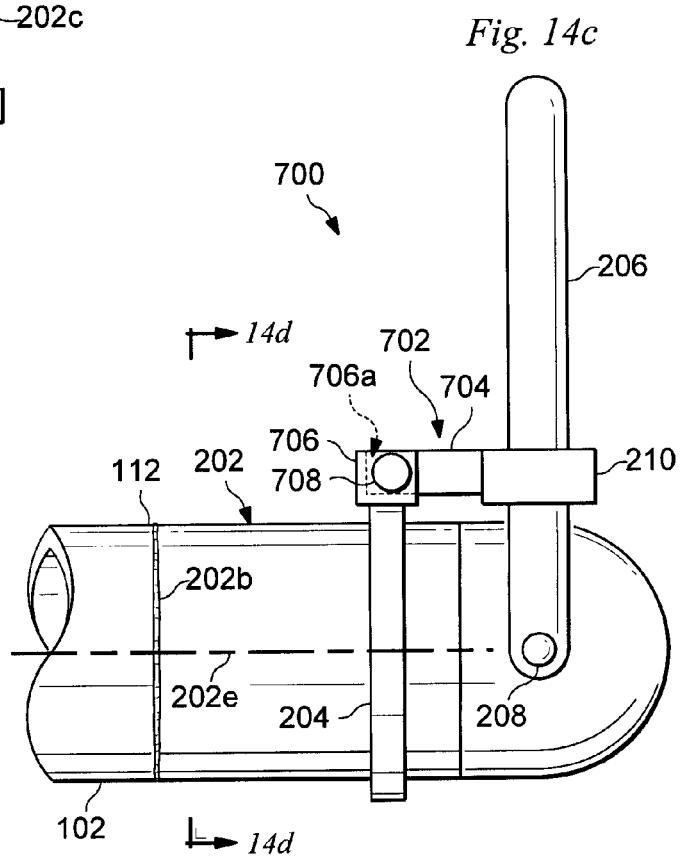
Figure 14D:
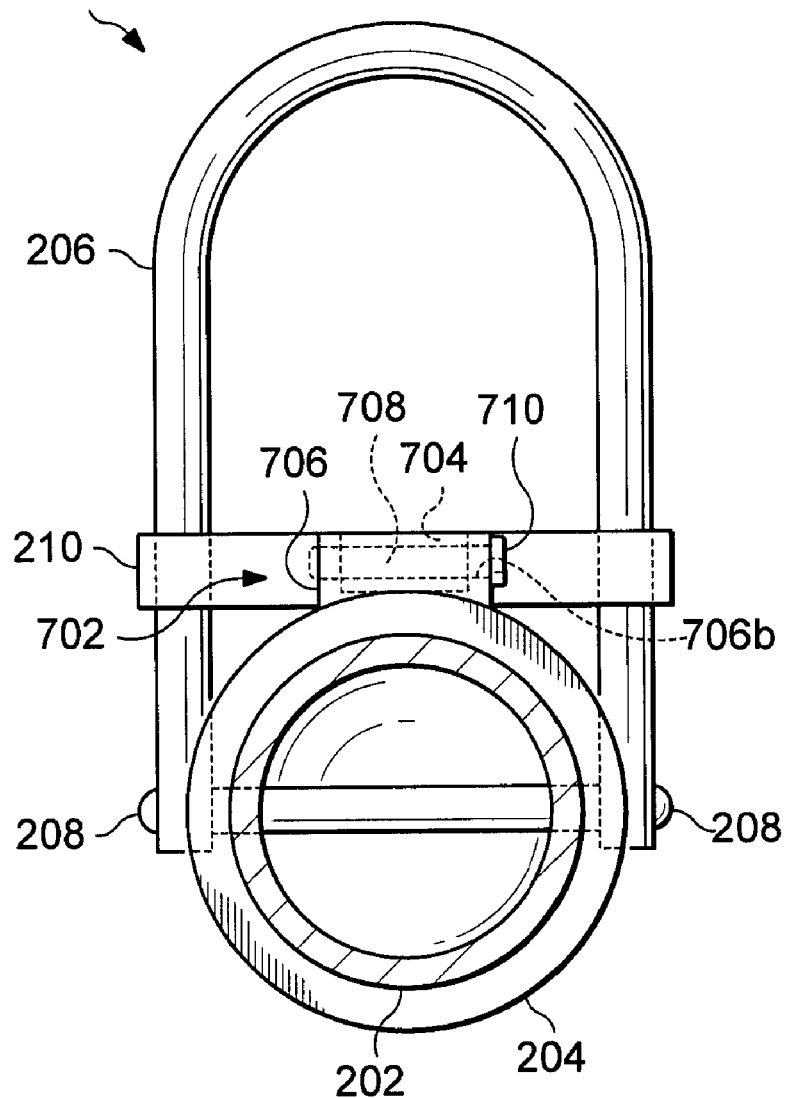
FIG. 14d is a cross sectional view illustrating an embodiment of the head apparatus of FIG. 14c.

Referring now to FIG. 12, an alternative embodiment of a head apparatus 500 is substantially identical in design and operation to head apparatus 200 described above with reference to FIGS. 6a, 6b, 7, 9a, and 9b, with provision of a hydraulic retaining member 502 replacing retaining member 212. Hydraulic retaining member 502 has one end coupled to tubular retaining section 204, and another end coupled to retaining member support 210.

In an exemplary embodiment, during operation of head apparatus 500, the hydraulic retaining member 502 will allow shackle lift member 206 to be rotated about pin 208 until it lies substantially along head member longitudinal axis 202e, such as during abandonment and recovery of the pipeline 102. When the pipeline 102 is abandoned, hydraulic retaining member 502 will exert a force on shackle lift member 206, holding it in an accessible position, similar to position B as illustrated in FIG. 7.

Hydraulic retaining member 502 may be hydraulic jack coupled to a section of shackle lift member 206 and tubular retaining section 204 on tubular head member 202. The force applied by hydraulic retaining member 502 should be such that the shackle lift member 206 is held in the accessible position under its own weight plus the impact from the wire 118 and hook 120 combination during engagement for recovery, but is allowed to rotate when the pipeline 102 is lifted or lowered during abandonment and recovery. Hydraulic retaining member 502 may be provided with a valve operable to be engaged by a hydraulic interface on an ROV in order to activate and release the jack with the hydraulic pump of the ROV.

Referring now to FIG. 13, an alternative embodiment of a head apparatus 600 is substantially identical in design and operation to head apparatus 200 described above with reference to FIGS. 6a, 6b, 7, 9a, and 9b, with provision of a modified shackle lift member 602 replacing retaining member 212 and retaining member support 210. Modified shackle lift member 502 includes a bend 604 in arms 206*a* and 206*b*, with arm 206*a* having an end that is pivotally coupled to one side of the head member lifting eye 202*c* by a pin 208, and an arm 206*b* having an end that is pivotally coupled to another side of the head member lifting eye 202*c* by pin 208.

In an exemplary embodiment, during operation of head apparatus 600, the modified shackle lift member 602 may rotate about pin 208 until it lies substantially along head member longitudinal axis 202*e*, such as during abandonment and recovery of the pipeline 102. When the pipeline 102 is abandoned, bend 604 in arms 206*a* and 206*b* creates a moment arm about pin 208 which holds modified shackle lift member 602 in an accessible position, similar to position B as illustrated in FIG. 7, supported by retaining member support 210, due to the distribution of the weight of modified shackle lift member 602 about pin 208.

Referring now to FIGS. 14*a*, 14*b*, 14*c*, and 14*d*, an alternative embodiment of a head apparatus 700 is substantially identical in design and operation to head apparatus 200 described above with reference to FIGS. 6*a*, 6*b*, 7, 9*a*, and 9*b*, with provision of a pin and hole retaining member 702 replacing retaining member 212. Pin and hole retaining member 702 includes a retaining member 704 coupled to retaining member support 210. A securing member 706 is coupled to tubular retaining section 204 and defines a channel 706*a* for accepting retaining member 704 and a channel 706*b* for accepting a pin 708. Retaining member 704 defines a channel 704*a* on one end that will line up with channel 706*b*, when retaining member 704 is placed in channel 706*a*, in order to accept pin 708. The pin 708 includes a pin head 710.

In an exemplary embodiment, during operation of head apparatus 700, the shackle lift member 206 may be rotated about pin 208 until it lies substantially along head member longitudinal axis 202*e*, such as during abandonment and recovery of the pipeline 102. When the pipeline 102 is to be abandoned, retaining member 704 is brought into the channel 706*a* on securing member 706. Pin 708 is then placed through the channel 706*b* on securing member 706 and through the channel 704*a* on retaining member 704, locking retaining member 704 in securing member 706, and holding shackle lift member 206 in an accessible position, similar to position B as illustrated in FIG. 7.

Pin head 710 on pin 708 may have a grip for engaging with the arms of an ROV so that the ROV can pull the pin 708 out of the securing member 706 during recovery or place the pin 708 in the securing member 706 during abandonment.

Figure 15A:
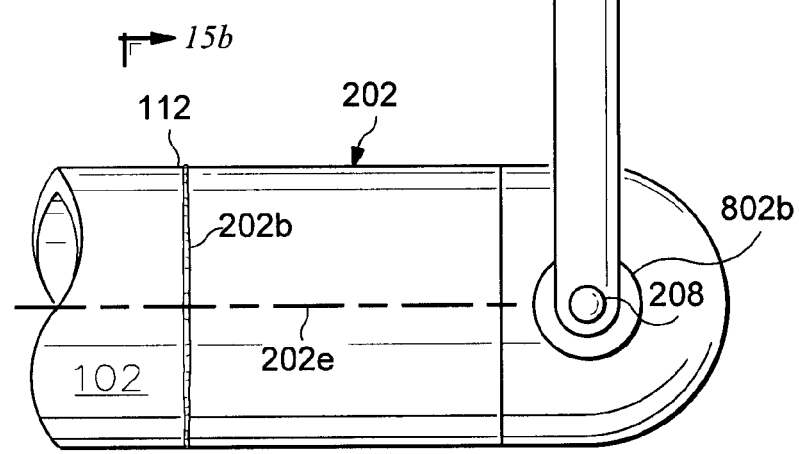
FIG. 15a is a side view illustrating an embodiment of a head apparatus including a frictional member.
Figure 15B:
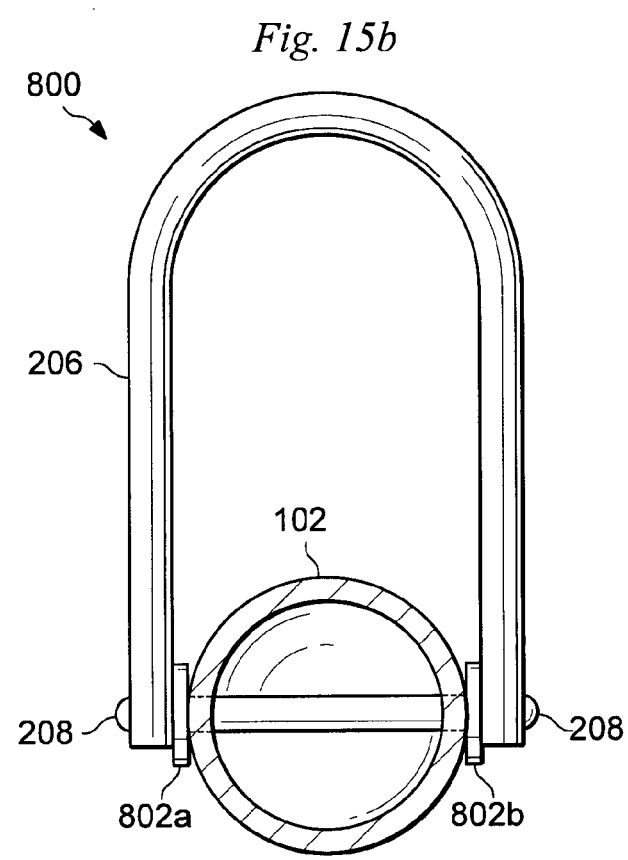

Referring now to FIGS. 15*a* and 15*b*, an alternative embodiment of a head apparatus 800 is substantially identical in design and operation to head apparatus 200 described above with reference to FIGS. 6*a*, 6*b*, 7, 9*a*, and 9*b*, with provision of a frictional member 802*a* and 802*b* coupled to pin 208 replacing retaining member 212. Frictional members 802*a* and 802*b* may include, for example, friction plates in contact planes between the shackle lift member 206 and the head member lifting eye 202*c* or equivalents thereof. Frictional members 802*a* and 802*b* should provide enough friction such that the shackle lift member 206 is held in an accessible position under its own weight plus the impact from the wire 118 and hook 120 combination during engagement for recovery, but is allowed to rotate when the pipeline 102 is lifted or lowered during abandonment and recovery.

Referring now to FIGS. 16*a* and 16*b*, an alternative embodiment of a head apparatus 900 is substantially identical in design and operation to head apparatus 200 described above with reference to FIGS. 6*a*, 6*b*, 7, 9*a*, and 9*b*, with provision of a modified solid head member lifting eye 902 replacing the solid head member lifting eye 202*c*. Modified solid head member lifting eye 902 is a semi-circular sheave which is coupled to tubular head member 202 and defines a hole for accepting pin 208.

An abandonment and recovery head apparatus has been described that includes a head member, a lift member moveably coupled to the head member, and a retaining device operable to hold the lift member in an accessible position. In an exemplary embodiment, the lift member is moveably coupled to the head member through a hinge. In an exemplary embodiment, the lift member is moveable between a first position along a first axis and a second position along a second axis that is substantially perpendicular to the first axis. In an exemplary embodiment, the retaining device includes a pin placeable through a channel coupled to the head member and the retaining device. In an exemplary embodiment, the retaining device includes a latch. In an exemplary embodiment, the retaining device includes friction between the lift member and the head member. In an exemplary embodiment, the retaining device includes a spring. In an exemplary embodiment, the retaining device includes a hydraulic jack. In an exemplary embodiment, the retaining device includes a support on the head member, whereby the lift member may rest against the support in a substantially vertical position with respect to the head member.

An abandonment and recovery head apparatus has been described that includes a head member, a lift member moveably coupled to the head member, the lift member moveable between a first position lying substantially along the axis of the head member and a second position substantially perpendicular to the axis of the head member, and a retaining device operable to hold the lift member in the second position through a direct connection between the retaining device and the head member. In an exemplary embodiment, the lift member is moveably coupled to the head member through a hinge. In an exemplary embodiment, the retaining device includes a pin placeable through a channel coupled to the head member and the retaining device. In an exemplary embodiment, the retaining device includes a latch. In an exemplary embodiment, the retaining device includes friction between the lift member and the head member. In an exemplary embodiment, the retaining device includes a spring. In an exemplary embodiment, the retaining device includes a hydraulic jack. In an exemplary embodiment, the retaining device includes a support on the head member, whereby the lift member may rest against the support substantially perpendicular to the head member.

A pipeline has been described that includes a head member coupled to a pipe, a lift member moveably coupled to the head member, and a retaining device operable to hold the lift member in an accessible position. In an exemplary embodiment, the lift member is moveably coupled to the head member through a hinge. In an exemplary embodiment, the lift member is moveable between a first position along a first axis and a second position along a second axis that is substantially perpendicular to the first axis. In an exemplary embodiment, the retaining device includes a pin placeable through a channel coupled to the head member and the retaining device. In an exemplary embodiment, the retaining device includes a latch. In an exemplary embodiment, the retaining device includes friction between the lift member and the head member. In an exemplary embodiment, the retaining device includes a spring. In an exemplary embodiment, the retaining device includes a hydraulic jack. In an exemplary embodiment, the retaining device includes a support on the head member, whereby the lift member may rest against the support in a substantially vertical position with respect to the head member. In an exemplary embodiment, the pipeline is situated beneath a body of water.

A method for abandoning and recovering a pipeline has been described that includes providing a head member including a coupling for attaching the head member to the pipeline, coupling a lift member to the head member, the lift member moveable between a first position and a second position, the second position being substantially perpendicular to the axis of the head member, and holding the lift member in the second position through contact between a retaining device and the head member. In an exemplary embodiment, the method further includes releasing the retaining device and allowing the lift member to move to the first position. In an exemplary embodiment, the pipeline is situated beneath a body of water.

A method for abandoning and recovering a pipeline has been described that includes providing a pipeline, coupling a head member to the pipeline, coupling a lift member to the head member, the lift member moveable between a first position and a second position, the second position being substantially perpendicular to the axis of the head member, and holding the lift member in the second position through contact between a retaining device and the head member. In an exemplary embodiment, the method further includes releasing the retaining device and allowing the lift member to move to the first position. In an exemplary embodiment, the pipeline is situated beneath a body of water.

An abandonment and recovery head apparatus has been described that includes a head member, a lift member moveably coupled to the head member, and a means for holding the lift member in an accessible position. In an exemplary embodiment, the lift member includes a pivoting means for coupling the lift member to the head member. In an exemplary embodiment, the lift member includes a pivoting means for situating the lift member between a first position along a first axis and a second position along a second axis that is substantially perpendicular to the first axis. In an exemplary embodiment, the means for holding the lift member in an accessible position includes a means for locking the retaining device to the head member. In an exemplary embodiment, the means for holding the lift member in an accessible position includes a means for latching the lift member to the head member. In an exemplary embodiment, the means for holding the lift member in an accessible position includes frictional means between the lift member and the head member. In an exemplary embodiment, the means for holding the lift member in an accessible position includes a spring means. In an exemplary embodiment, the means for holding the lift member in an accessible position includes a hydraulic means. In an exemplary embodiment, the means for holding the lift member in an accessible position includes a support means on the head member for resting the lift member against the support means in a substantially vertical position with respect to the head member.

An abandonment and recovery head apparatus has been described that includes a tubular head member including a retaining section on its surface, a shackle lift member moveably coupled to the tubular head member by at least one pin, the shackle lift member including a plurality of arms coupled to the at least one pin and an arcuate section joining the plurality of arms, a latch member support structure coupled to and spanning the plurality of arms, and a latch member moveably coupled to the latch member support structure on a hinge, the latch member operable to hold the shackle lift member in an accessible position through contact with the retaining section.

An abandonment and recovery head apparatus has been described that includes a tubular head member including a retaining section on its surface, an arcuate support member moveably coupled to the tubular head member by at least one pin, a ring lift member rotatably coupled to the arcuate support member, a latch member support structure coupled to the arcuate support member, and a latch member moveably coupled to the latch member support structure on a hinge, the latch member operable to hold the shackle lift member in an accessible position through contact with the retaining section.

An abandonment and recovery head apparatus has been described that includes a tubular head member including a retaining section on its surface, a shackle lift member moveably coupled to the tubular head member by at least one pin, the shackle lift member including a plurality of arms coupled to the at least one pin and an arcuate section joining the plurality of arms, a spring member support structure coupled to and spanning the plurality of arms, and a spring member coupled to the spring member support structure and the retaining section, the spring member operable to hold the shackle lift member in an accessible position.

An abandonment and recovery head apparatus has been described that includes a tubular head member including a retaining section on its surface, a shackle lift member moveably coupled to the tubular head member by at least one pin, the shackle lift member including a plurality of arms coupled to the at least one pin and an arcuate section joining the plurality of arms, a hydraulic member support structure coupled to and spanning the plurality of arms, and a hydraulic member coupled to the hydraulic member support structure and the retaining section, the hydraulic member operable to hold the shackle lift member in an accessible position.

An abandonment and recovery head apparatus has been described that includes a tubular head member including a retaining section on its surface, a shackle lift member moveably coupled to the tubular head member by at least one pin, the shackle lift member including a plurality of arms coupled to the at least one pin and an arcuate section joining the plurality of arms, and a bend in the arms such that the shackle lift member may be supported by the retaining section while being held in an accessible position.

An abandonment and recovery head apparatus has been described that includes a tubular head member including a retaining section on its surface, a shackle lift member moveably coupled to the tubular head member by at least one first pin, the shackle lift member including a plurality of arms coupled to the at least one first pin and an arcuate section joining the plurality of arms, a retaining member support structure coupled to and spanning the plurality of arms, a retaining member coupled to the retaining member support structure, the retaining member defining a first pin receiving channel, a securing member coupled to the retaining section, the securing member defining a retaining member receiving channel and a second pin receiving channel, and a second pin operable to hold the shackle lift member in an accessible position when the retaining member is situated in the retaining member receiving channel and the second pin is placed in the first pin receiving channel and the second pin receiving channel.

A method for abandoning and recovering a pipeline has been described that includes providing a pipeline situated beneath a body of water, providing a head member having a coupling for attaching the head member to the pipeline, coupling a lift member on the head member, the lift member moveable between a first position and a second position, the second position being substantially perpendicular to the axis of the head member, holding the lift member in the second position through contact between a retaining device and the head member, and releasing the retaining device and allowing the lift member to move to the first position.

An abandonment and recovery head apparatus has been described that includes a head member including a retaining means on its surface, a lift member including a pivoting means for pivotally coupling the lift member to the head member, and means for holding the lift member in an accessible position through contact with the retaining means, whereby the means for holding the lift member in an accessible position through contact with the retaining means includes a means for pivotally coupling the means for holding the lift member in an accessible position through contact with the retaining means to the lift member.

It is understood that variations may be made in the foregoing without departing from the scope of the invention. Furthermore, the elements and teachings of the various illustrative embodiments may be combined in whole or in part some or all of the illustrative embodiments.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An abandonment and recovery head apparatus comprising:
   a head member;
   a lift member moveably coupled to the head member; and
   a retaining device operable to hold the lift member in an accessible position, whereby the lift member is operable to be decoupled from a vessel in order to abandon a pipeline that is coupled to the head member and couple to the vessel when the lift member is in the accessible position in order to recover the pipeline that is coupled to the head member.

2. The apparatus of claim 1 wherein the lift member is moveably coupled to the head member through a hinge.

3. The apparatus of claim 1 wherein the lift member is moveable between a first position along a first axis and a second position along a second axis that is substantially perpendicular to the first axis.

4. The apparatus of claim 1 wherein the retaining device comprises a latch.

5. The apparatus of claim 1 wherein the retaining device comprises a support on the head member, whereby the lift member may rest against the support in a substantially vertical position with respect to the head member.

6. The apparatus of claim 1 wherein the retaining device is free of a buoyed member.

7. An abandonment and recovery head apparatus comprising:
   a head member;
   a lift member moveably coupled to the head member, the lift member moveable between a first position lying substantially along the axis of the head member and a second position substantially perpendicular to the axis of the head member; and
   a retaining device operable to hold the lift member in the second position through a direct connection between the retaining device and the head member, whereby the lift member is operable to decouple from a vessel in order to abandon a pipeline that is coupled to the head member.

8. The apparatus of claim 7 wherein the lift member is moveably coupled to the head member through a hinge.

9. The apparatus of claim 7 wherein the retaining device comprises a latch.

10. The apparatus of claim 7 wherein the retaining device comprises a support on the head member, whereby the lift member may rest against the support substantially perpendicular to the head member.

11. A pipeline comprising:
    a head member coupled welded to a pipe;
    a lift member moveably coupled to the head member; and
    a retaining device operable to hold the lift member in an accessible position.

12. The pipeline of claim 11 wherein the lift member is moveably coupled to the head member through a hinge.

13. The pipeline of claim 11 wherein the lift member is moveable between a first position along a first axis and a second position along a second axis that is substantially perpendicular to the first axis.

14. The pipeline of claim 11 wherein the retaining device comprises a latch.

15. The pipeline of claim 11 wherein the retaining device comprises a support on the head member, whereby the lift member may rest against the support in a substantially vertical position with respect to the head member.

16. The pipeline of claim 11 wherein the pipeline is situated beneath a body of water.

17. The pipeline of claim 11 wherein the retaining device is free of a buoyed member.

18. A method for abandoning and recovering a pipeline comprising:
    providing a head member comprising a coupling for attaching the head member to the pipeline;
    coupling a lift member to the head member, the lift member moveable between a first position and a second position, the second position being substantially perpendicular to the axis of the head member; and
    holding the lift member in the second position through contact between a retaining device and the head member, whereby the second position allows the coupling of the lift member to a vessel after the lift member has been decoupled from the vessel in order to abandon a pipeline that is coupled to the head member.

19. The method of claim 18 further comprising:
    releasing the retaining device and allowing the lift member to move to the first position.

20. The method of claim 18 wherein the pipeline is situated beneath a body of water.

21. A method for abandoning and recovering a pipeline comprising:
    providing a pipeline;
    welding a head member to an end of the pipeline;
    coupling a lift member to the head member, the lift member moveable between a first position and a second position, the second position being substantially perpendicular to the axis of the head member; and
    holding the lift member in the second position through contact between a retaining device and the head member.

22. The method of claim 21 further comprising:
  releasing the retaining device and allowing the lift member to move to the first position.

23. The method of claim 21 wherein the pipeline is situated beneath a body of water.

24. An abandonment and recovery head apparatus comprising:
  a head member;
  a lift member moveably coupled to the head member;
  means for holding the lift member in an accessible position; and
  means for abandoning a pipeline coupled to the head member.

25. The apparatus of claim 24 wherein the lift member comprises a pivoting means for coupling the lift member to the head member.

26. The apparatus of claim 24 wherein the lift member comprises a pivoting means for situating the lift member between a first position along a first axis and a second position along a second axis that is substantially perpendicular to the first axis.

27. The apparatus of claim 24 wherein the means for holding the lift member in an accessible position comprises a means for locking the retaining device to the head member.

28. The apparatus of claim 24 wherein the means for holding the lift member in an accessible position comprises a means for latching the lift member to the head member.

29. The apparatus of claim 24 wherein the means for holding the lift member in an accessible position comprises a support means on the head member for resting the lift member against the support means in a substantially vertical position with respect to the head member.

30. The apparatus of claim 24 wherein the means for holding the lift member in an accessible position is free of a buoyed member.

31. An abandonment and recovery head apparatus comprising:
  a tubular head member comprising a retaining section on its surface;
  a shackle lift member moveably coupled to the tubular head member by at least one pin, the shackle lift member comprising a plurality of arms coupled to the at least one pin and an arcuate section joining the plurality of arms;
  a latch member support structure coupled to and spanning the plurality of arms; and
  a latch member moveably coupled to the latch member support structure on a hinge, the latch member operable to hold the shackle lift member in an accessible position through contact with the retaining section.

32. An abandonment and recovery head apparatus comprising:
  a tubular head member comprising a retaining section on its surface;
  an arcuate support member moveably coupled to the tubular head member by at least one pin;
  a ring lift member rotatably coupled to the arcuate support member;
  a latch member support structure coupled to the arcuate support member; and
  a latch member moveably coupled to the latch member support structure on a hinge, the latch member operable to hold the shackle lift member in an accessible position through contact with the retaining section.

33. A method for abandoning and recovering a pipeline comprising:
  providing a pipeline situated beneath a body of water;
  providing a head member having a coupling for attaching the head member to the pipeline;
  coupling a lift member on the head member, the lift member moveable between a first position and a second position, the second position being substantially perpendicular to the axis of the head member;
  holding the lift member in the second position through contact between a retaining device and the head member; and
  releasing the retaining device and allowing the lift member to move to the first position.

34. An abandonment and recovery head apparatus comprising:
  a head member comprising a retaining means on its surface;
  a lift member comprising a pivoting means for pivotally coupling the lift member to the head member;
  means for holding the lift member in an accessible position through contact with the retaining means, whereby the means for holding the lift member in an accessible position through contact with the retaining means comprises a means for pivotally coupling the means for holding the lift member in an accessible position through contact with the retaining means to the lift member; and
  means for abandoning a pipeline coupled to the head member.

35. An abandonment and recovery head apparatus, comprising:
  a head member;
  a lift member moveably coupled to the head member; and
  a retaining device operable to hold the lift member in an accessible position for allowing a hook that is coupled to a vessel to engage the lift member such that the vessel may recover a pipeline that is coupled to the head member after the vessel has abandoned the pipeline by disengaging the hook from the lift member.

36. An abandonment and recovery head apparatus comprising:
  a head member;
  a shackle lift member moveably coupled to the head member, the shackle lift member moveable between a first position lying substantially along the axis of the head member and a second position substantially perpendicular to the axis of the head member; and
  a rigid retaining device operable to hold the lift member in the second position through a direct connection between the rigid retaining device and the head member, whereby the second position is operable to allow a hook to engage the shackle lift member.

37. An abandonment and recovery head apparatus comprising:
  a head member;
  a shackle lift member moveably coupled to the head member, the shackle lift member moveable between a first position lying substantially along the axis of the head member and a second position substantially perpendicular to the axis of the head member; and
  rigid retaining means operable to hold the shackle lift member in the second position through a direct connection between the rigid retaining means and the head member, whereby the second position is operable to allow a hook to engage the shackle lift member.

38. The apparatus of claim 37, wherein the rigid retaining means is moveably coupled to the lift member and is operable to hold the lift member in the accessible position by engaging the head member.

39. The apparatus of claim 37, wherein the second position comprises the lift member substantially perpendicular to the head member such that the lift member extends vertically above the head member.

40. The apparatus of claim 37, wherein the rigid retaining means is moveably coupled to the lift member and is operable to hold the lift member in the second position when the lift member is decoupled from a vessel.

41. The apparatus of claim 37, wherein the second position comprises the lift member substantially perpendicular to the head member such that the lift member extends vertically above the head member in order to allow the a vessel to couple to the lift member.

42. The apparatus of claim 37, wherein the rigid retaining means is operable to provide a direct connection between the lift member to the head member and hold the lift member substantially perpendicular to the head member.

43. The apparatus of claim 37, wherein the accessible second position comprises the lift member substantially perpendicular to a sea floor when the pipeline is decoupled from a vessel such that the vessel may recouple to the pipeline by engaging the lift member.

44. A method for abandoning and recovering a pipeline comprising:
providing a head member comprising a coupling for attaching the head member to the pipeline;
coupling a lift member to the head member, the lift member moveable between a first position and a second position, the second position being substantially perpendicular to the axis of the head member;
holding the lift member in the second position through contact between a retaining device and the head member; and
releasing the retaining device and allowing the lift member to move to the first position.

45. A method for abandoning and recovering a pipeline comprising:
providing a pipeline;
coupling a head member to an end of the pipeline;
coupling a lift member to the head member, the lift member moveable between a first position and a second position, the second position being substantially perpendicular to the axis of the head member;
holding the lift member in the second position through contact between a retaining device and the head member; and
releasing the retaining device and allowing the lift member to move to the first position.

46. An abandonment and recovery head apparatus comprising:
a head member;
a lift member moveably coupled to the head member; and
a retaining device operable to hold the lift member in an accessible position, whereby the lift member may be used to recover and abandon a pipeline coupled to the head member.

47. A pipeline comprising:
a pipe; and
an abandonment and recover head apparatus secured to the pipe, whereby the abandonment and recover head apparatus is operable to couple to and decouple from a vessel, the abandonment and recover head apparatus comprising:
a head member engaging the pipe
a lift member moveably coupled to the head member; and
a retaining device operable to hold the lift member in an accessible position.

48. A method for abandoning and recovering a pipeline comprising:
providing a pipeline coupled to a vessel;
coupling an abandonment and recovery head apparatus to the pipeline, the abandonment and recovery head apparatus comprising a head member, a lift member moveably coupled to the head member, and a retaining device;
abandoning the pipeline by lowering the pipeline to a sea floor using the lift member and decoupling the vessel from the pipeline; and
holding the lift member in an accessible position by engaging the retaining device with the lift member.

49. The method of claim 48, further comprising:
recovering the pipeline by engaging the lift member in the accessible position to couple the pipeline to the vessel.

50. An abandonment and recovery head apparatus comprising:
means for abandoning a pipeline; and
means for recovering the pipeline after abandoning the pipeline.

* * * * *